US008365094B2

(12) United States Patent
Sato et al.

(10) Patent No.: US 8,365,094 B2
(45) Date of Patent: Jan. 29, 2013

(54) HIERARCHICAL STRUCTURE DISPLAY DEVICE

(75) Inventors: Tatsuya Sato, Ichinomiya (JP); Noriko Sugimoto, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 663 days.

(21) Appl. No.: 12/023,966

(22) Filed: Jan. 31, 2008

(65) Prior Publication Data

US 2008/0184171 A1 Jul. 31, 2008

(30) Foreign Application Priority Data

Jan. 31, 2007 (JP) ................................. 2007-022496

(51) Int. Cl.
*G06F 3/048* (2006.01)
(52) U.S. Cl. ........ 715/810; 715/853; 715/855; 715/836; 715/767; 715/835
(58) Field of Classification Search .................. 715/853, 715/810, 855, 836, 767, 835, 841; 345/440; 1/1; 707/769; 704/251
See application file for complete search history.

(56) References Cited

U.S. PATENT DOCUMENTS

| 5,418,946 | A | * | 5/1995 | Mori ................................... 1/1 |
| 5,546,522 | A | * | 8/1996 | Nishida et al. ................. 715/810 |
| 5,606,654 | A | * | 2/1997 | Schuur .......................... 345/440 |
| 5,708,787 | A | * | 1/1998 | Nakano et al. ................. 715/841 |
| 5,727,195 | A | * | 3/1998 | Nakatsuyama ............... 707/769 |
| 6,661,437 | B1 | * | 12/2003 | Miller et al. .................... 715/810 |
| 7,191,411 | B2 | * | 3/2007 | Moehrle ........................ 715/855 |
| 7,543,245 | B2 | * | 6/2009 | Irimajiri ......................... 715/836 |
| 7,698,654 | B2 | * | 4/2010 | Fong et al. ..................... 715/810 |
| 2003/0007010 | A1 | * | 1/2003 | Ullmann et al. ............... 345/810 |
| 2003/0013493 | A1 | | 1/2003 | Irimajiri et al. |
| 2004/0243943 | A1 | * | 12/2004 | Matsumoto et al. .......... 715/841 |

(Continued)

FOREIGN PATENT DOCUMENTS

| JP | 2002-140144 A | 5/2002 |
| JP | 2008-009781 A | 1/2008 |

OTHER PUBLICATIONS

Japan Patent Office, Office Action for Japanese Patent Application No. 2007-022496, mailed Feb. 8, 2011.

*Primary Examiner* — Steven Sax
*Assistant Examiner* — David Choi
(74) *Attorney, Agent, or Firm* — Baker Botts L.L.P.

(57) ABSTRACT

The hierarchical structure display device includes a hierarchical structure storing unit, a display unit, and a display control unit. The hierarchical structure storing unit stores information about a hierarchical structure of menus where each item contained in a menu is linked to a directly beneath level menu. The display control unit controls the display unit to display at least one menu in the display screen and to preserve at least a first region in the display screen for displaying titles of items contained in a menu of interest. The titles of items contained in a menu are arranged one after another in the second direction with each title extending in the first direction, and the first region has a first length in the first direction long enough to entirely visibly indicate the titles of items. When the designating unit designates items in succession while advancing to a deeper level of the menus, the display control unit controls the display unit to preserve in the display screen not only the first region but also a second region that has a second length extending in the first direction and being shorter than the first length and to display at least a part of the menus in the second region.

16 Claims, 16 Drawing Sheets

U.S. PATENT DOCUMENTS

| | | | |
|---|---|---|---|
| 2006/0055789 A1* | 3/2006 | Jin et al. | 348/208.12 |
| 2006/0064651 A1* | 3/2006 | Ito | 715/853 |
| 2007/0130532 A1* | 6/2007 | Fuller et al. | 715/764 |
| 2008/0184171 A1* | 7/2008 | Sato et al. | 715/841 |
| 2009/0009535 A1* | 1/2009 | Iwamoto et al. | 345/666 |
| 2010/0005421 A1* | 1/2010 | Yoshioka | 715/835 |
| 2010/0153111 A1* | 6/2010 | Hirai et al. | 704/251 |
| 2010/0211901 A1* | 8/2010 | Nezu et al. | 715/767 |

* cited by examiner

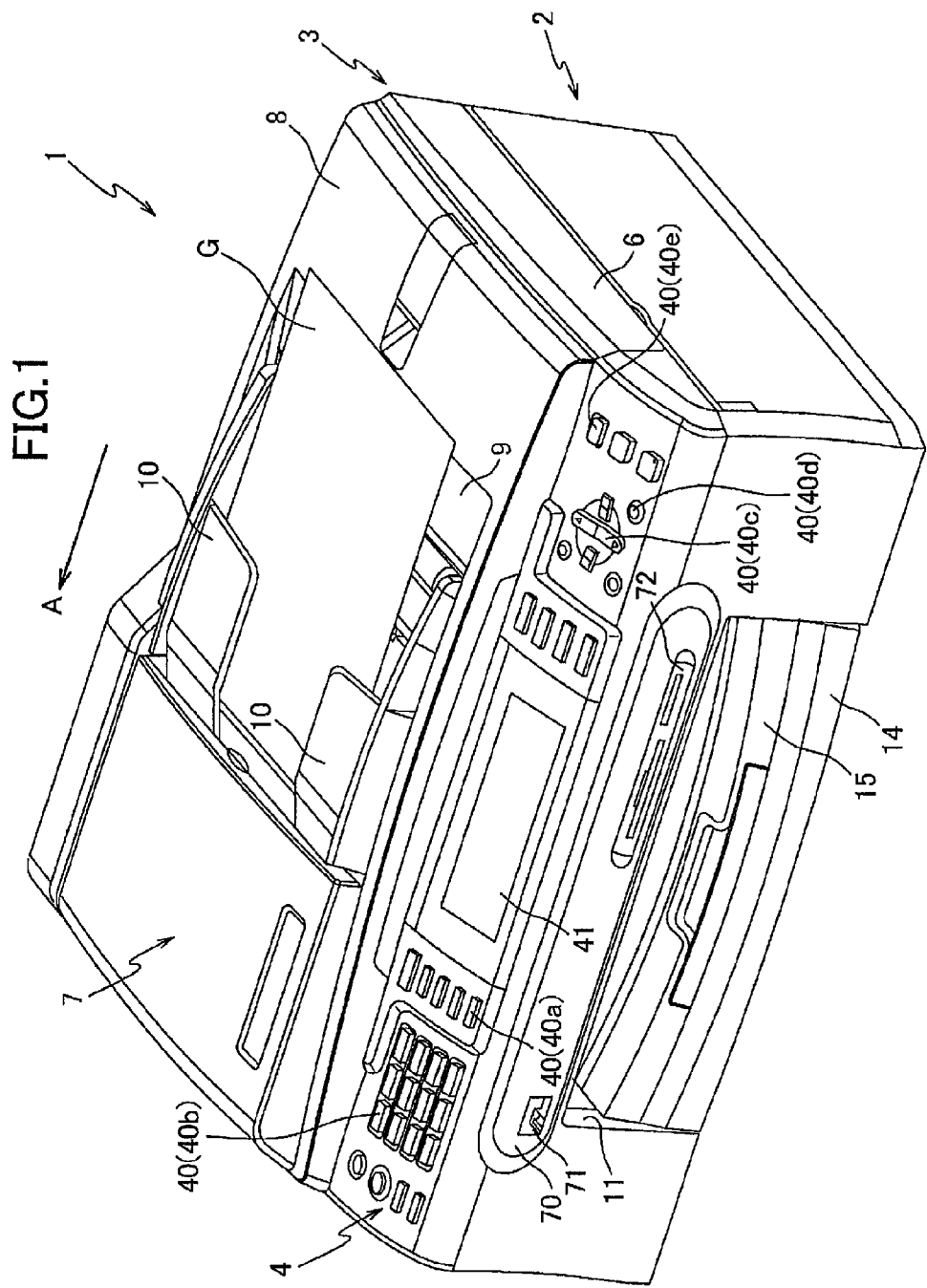

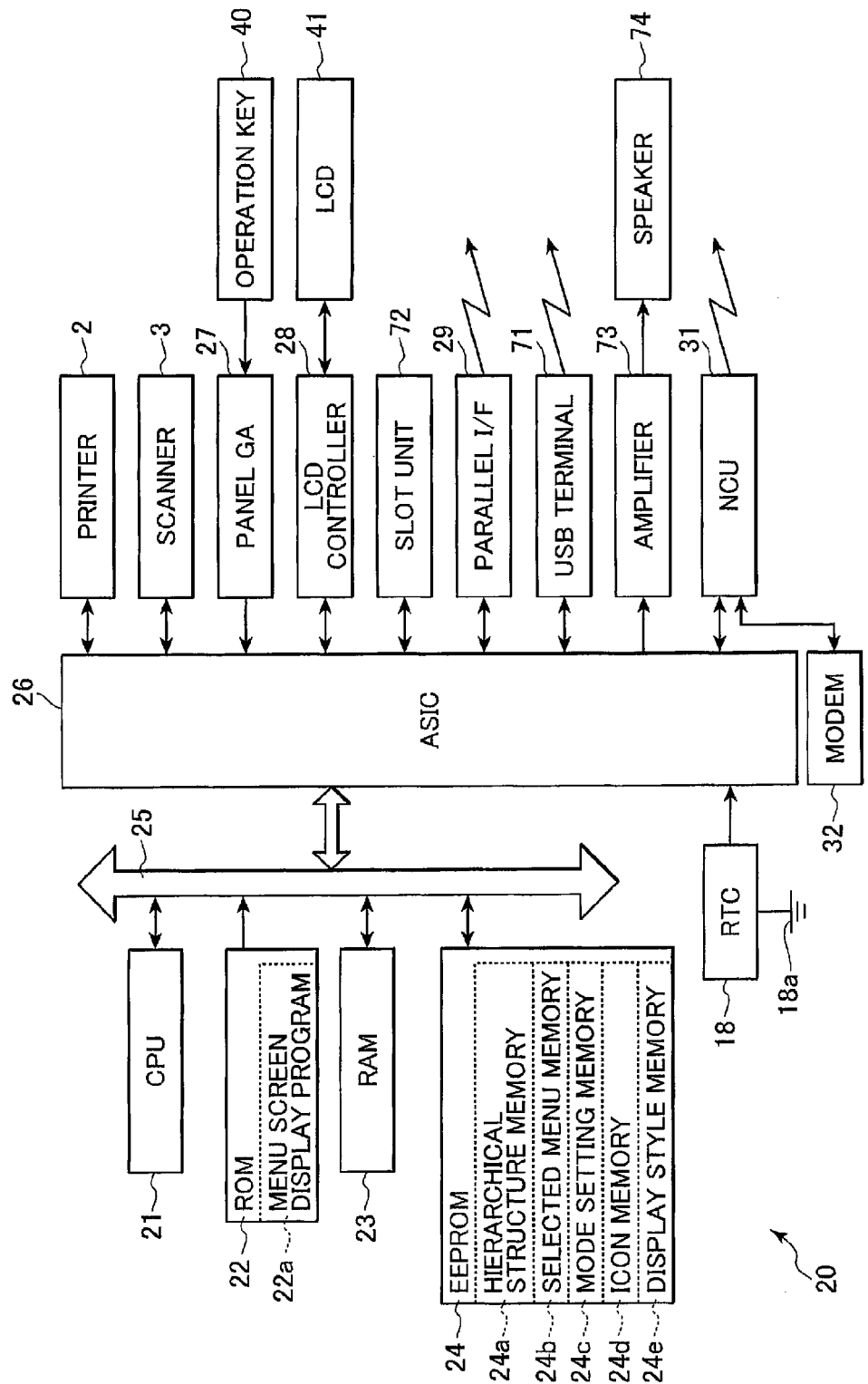

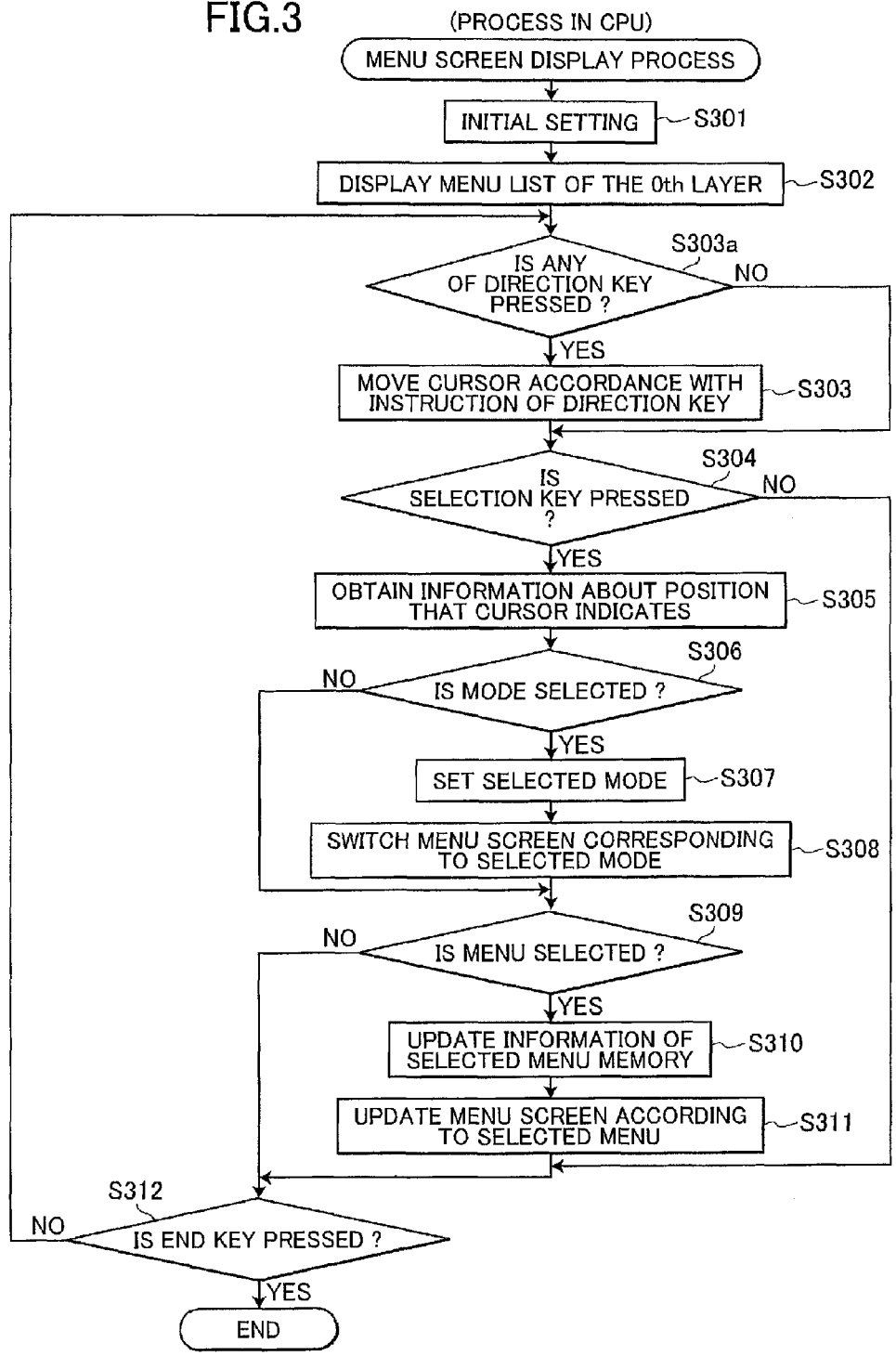

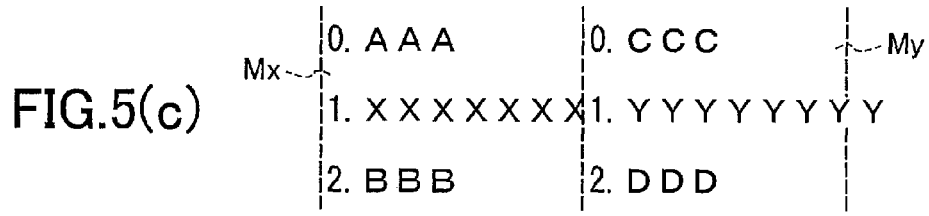
FIG.5(c)
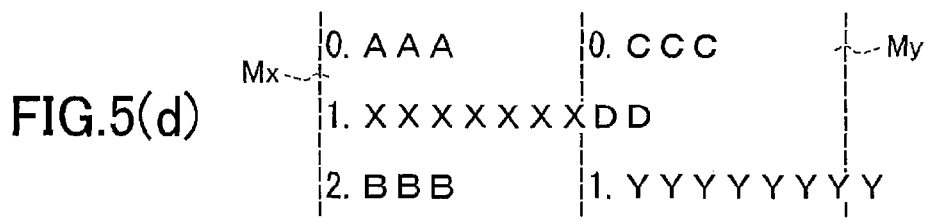
FIG.5(d)
FIG.6(a)
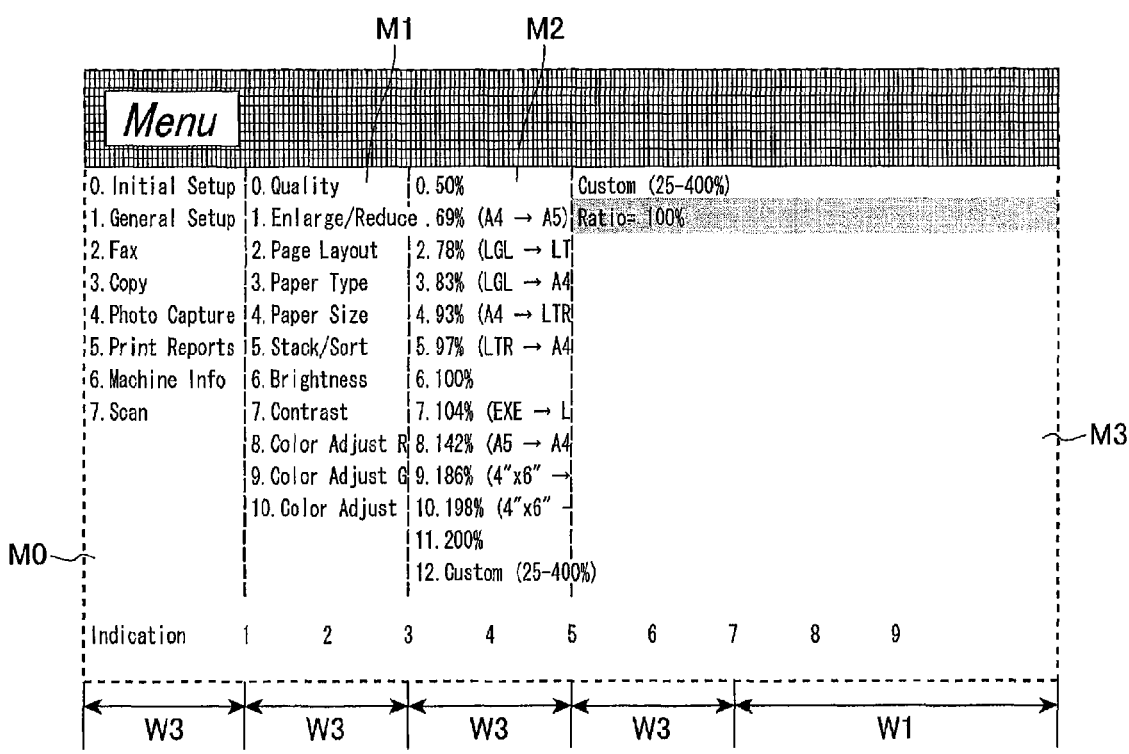

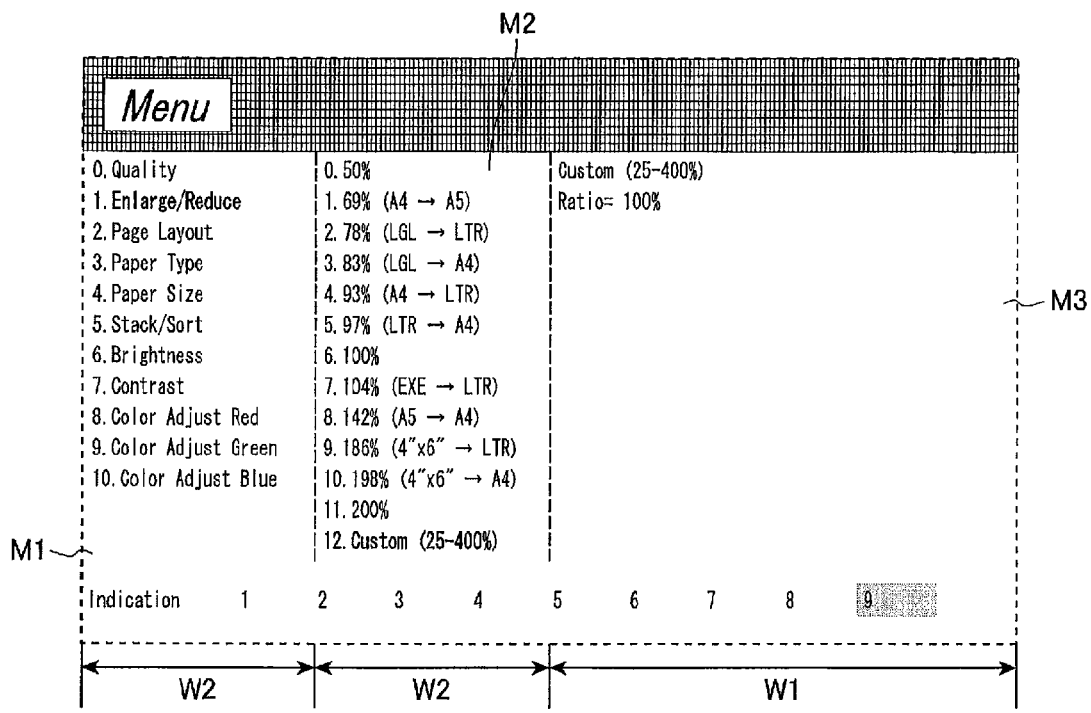
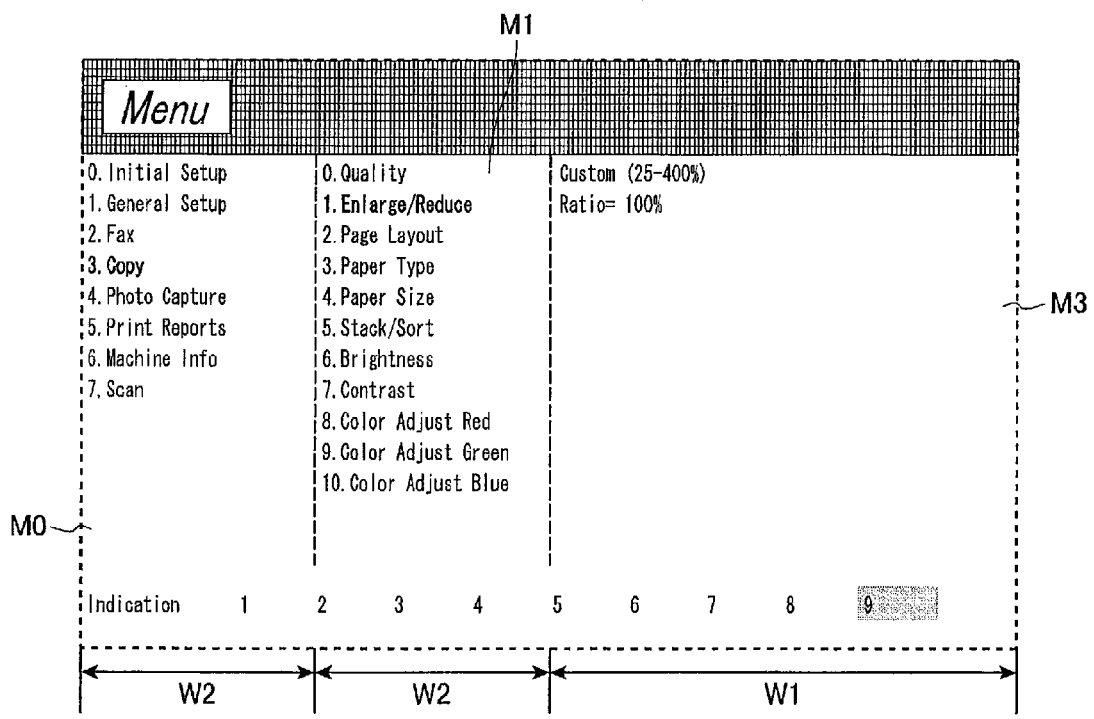

HIERARCHICAL STRUCTURE DISPLAY DEVICE

CROSS REFERENCE TO RELATED APPLICATIONS

This application claims priority from Japanese Patent Application No. 2007-022496, filed on Jan. 31, 2007. The entire content of each of these priority applications is incorporated herein by reference.

TECHNICAL FIELD

The invention relates to a display printing device and a hierarchical structure display device. In particular, the present invention relates to a hierarchical structure display device and a hierarchical structure display method capable of displaying all of a current menu list or setting item on a layer to be selected currently, and menu lists or the setting items of higher layers than the current menu list to be selected currently.

BACKGROUND

There has been a known conventional technique that displays names of a plurality of menus as a menu list on a display device. Each menu belongs to a corresponding layer configuring a hierarchical structure. In the menu list, the names of the plurality of menus are arranged along a line intersecting a line parallel to a width direction of a displaying means. In relation to this technique, Japanese Patent Application Publication JP2002-514328 (page 18, paragraph 3, FIG. 5)) describes a technique that, when each menu list is displayed from the left to the right of a screen sequentially from a highest layer, the screen displays a menu list of a layer requested to be displayed and a menu list of a layer immediately higher than such layer. Menu lists of a layer even higher than these layers is hidden by scrolling the screen from the right to the left.

SUMMARY

In Japanese Patent Application Publication JP2002-514328, the menu list of the layer requested to be displayed and the menu list of the layer immediately higher than such layer can be checked at a glance. However, the menu list of the layer even higher than these layers is not displayed. Thus, there has been a problem that all of menu lists of higher layers leading to the menu list of the layer requested to be displayed cannot be checked on the same screen. For this reason, it is inconvenient that, for example, even if the user makes a mistake realizes in the course of operation advancing through the hierarchy structure, the user cannot immediately check on which layer the user makes the mistake.

An object of the present invention is to provide a hierarchical structure display device and a hierarchical structure display method and program capable of displaying all of a menu list of a layer requested to be displayed and menu lists of higher layers leading to the menu list of the layer requested to be displayed, even in a limited display region.

In order to attain the above and other objects, the invention provides a hierarchical structure display device. The hierarchical structure display device includes a hierarchical structure storing unit, a display unit, a designating unit, and a display control unit. The hierarchical structure storing unit stores information about a hierarchical structure of menus where each item contained in a menu is linked to a directly beneath level menu. The display unit has a display screen extending in a first direction and a second direction orthogonal to the first direction. The designating unit designates an item contained in each of the menus. The display control unit controls the display unit to display at least one menu in the display screen based on the information stored in the hierarchical structure storing unit and to preserve at least a first region in the display screen for displaying titles of items contained in a menu of interest, wherein the titles of items contained in a menu are arranged one after another in the second direction with each title extending in the first direction, and the first region has a first length in the first direction long enough to entirely visibly indicate the titles of items, and wherein when the designating unit designates items in succession while advancing to a deeper level of the menus, the display control unit controls the display unit to preserve in the display screen not only the first region but also a second region that has a second length extending in the first direction and being shorter than the first length and to display at least a part of the menus in the second region.

According to another aspects, the invention provides a hierarchical structure display method. The hierarchical structure display method controls a hierarchical structure display device storing information about a hierarchical structure of menus where each item contained in a menu is linked to a directly beneath level menu, and having a display unit that has a display screen extending in a first direction and a second direction orthogonal to the first direction. The method includes designating an item contained in each of the menus, and controlling the display unit to display at least one menu in the display screen based on the information about the hierarchical structure of menus and to preserve at least a first region in the display screen for displaying titles of items contained in a menu of interest. The titles of items contained in a menu are arranged one after another in the second direction with each title extending in the first direction, and the first region has a first length in the first direction long enough to entirely visibly indicate the titles of items. When the designating designates items in succession while advancing to a deeper level of the menus, the controlling controls the display unit to preserve in the display screen not only the first region but also a second region that has a second length extending in the first direction and being shorter than the first length and to display at least a part of the menus in the second region.

According to still another aspects, the invention provides a computer-readable storage medium. The computer-readable storage medium storing a set of program instructions executable on a hierarchical structure display device that stores information about a hierarchical structure of menus where each item contained in a menu is linked to a directly beneath level menu, and that has a display unit having a display screen extending in a first direction and a second direction orthogonal to the first direction. The program instructions includes designating an item contained in each of the menus, and controlling the display unit to display at least one menu in the display screen based on the information about the hierarchical structure of menus and to preserve at least a first region in the display screen for displaying titles of items contained in a menu of interest. The titles of items contained in a menu are arranged one after another in the second direction with each title extending in the first direction, and the first region has a first length in the first direction long enough to entirely visibly indicate the titles of items. When the designating designates items in succession while advancing to a deeper level of the menus, the controlling controls the display unit to preserve in the display screen not only the first region but also a second region that has a second length extending in the first direction and being shorter than the first length and to display at least a part of the menus in the second region.

BRIEF DESCRIPTION OF THE DRAWINGS

In the drawings:

FIG. 1 is a perspective view showing the outer structure of a multifunction device according to an embodiment;

FIG. 2 is a block diagram showing an electric structure of the control unit of the multifunction device;

FIG. 3 is a flowchart showing a menu screen display process;

FIG. 5(c) is an explanatory diagram illustrating a relation between two selected menus;

FIG. 5(d) is an explanatory diagram illustrating a relation between two selected menus;

FIG. 6(a) is a diagram illustrating a transition of the menu screen in the second mode;

FIG. 13(b) is a diagram illustrating the menu screen when the ninth mode is selected; and FIG. 13(c) is a diagram illustrating the menu screen when a selection key is pressed in the ninth mode.

DETAILED DESCRIPTION

Figure 4A:
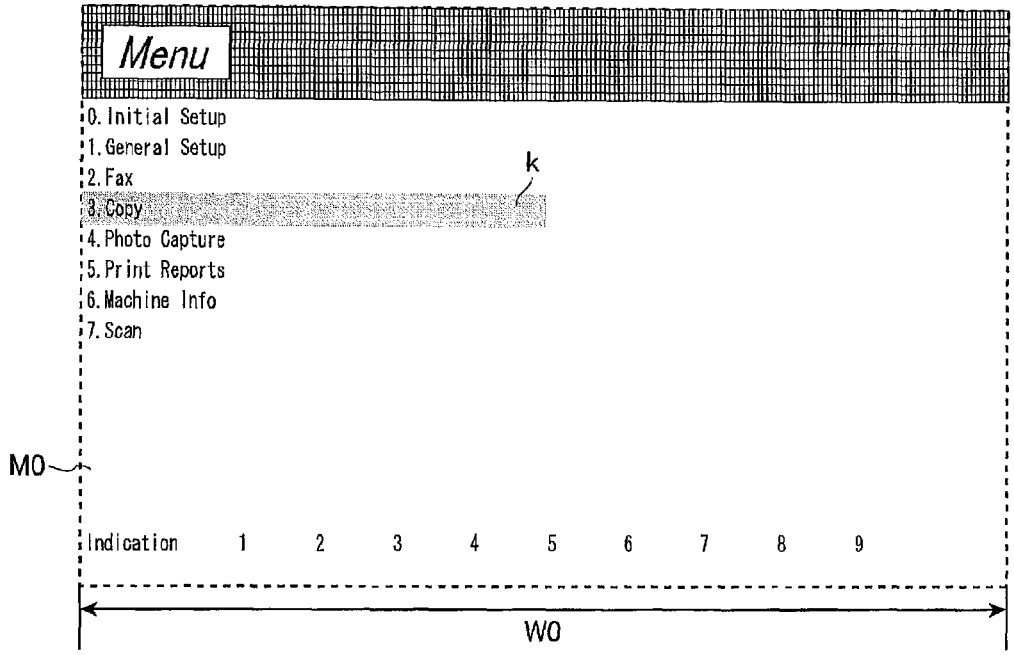
FIG. 4(a) is a diagram illustrating a menu screen when a menu list of zeroth layer is displayed.

Next, an embodiment of the invention will be described while referring to the accompanying drawings. FIG. 1 is a perspective view showing the outer structure of a multifunction device 1 according to an embodiment of the present invention. As shown in FIG. 1, a multifunction device 1 is integrally configured of a printer 2 disposed on the bottom, a scanner 3 disposed on the top, and a control panel 4 provided on the front surface of the scanner 3. The multifunction device 1 implements a scanner function, a copier function, and a facsimile function.

In addition to the above, the multifunction device 1 includes a function to record data on a recording sheet received from an external device which is connected to the multifunction device 1, such as a USB memory, a digital camera, and a personal computer. Also, the multifunction device 1 includes a function to display the data received from the external device on a liquid crystal display (LCD) 41 provided on the control panel 4.

A name (title) of each menu used for setting with respect to the above variety of functions is stored as a hierarchical structure in the multifunction device 1. The multifunction device 1 function as a hierarchical structure display device of the invention that can display the name (title) of each menu constructing the hierarchical structure on the LCD 41 that has a limited display region. The multifunction device 1 can display all of a menu list of a layer requested to be displayed on the LCD 41 and menu lists of higher layers that leads to the menu list requested to be displayed on the LCD 41. Here, the menu list includes names (title) of the menu.

The scanner 3 includes a document reading unit 6 functioning as a flatbed scanner (FBS), and a document cover 8 for the document reading unit 6. The document cover 8 includes an auto document feeder (hereinafter referred to as "ADF") 7. The document reading unit 6 includes a platen grass on a top surface thereof. The document reading unit 6 includes an image reading unit (not shown) therein. The scanner 3 having the above configuration reads out an image of a document by using the FBS or the ADF 7.

The ADF 7 conveys a document G from a document tray 9 to a document discharge tray 10 through a document conveying path. In a conveying process of the document G by the ADF 7, the document G passes on a reading surface on the document reading unit 6, and an image of the document G is read out by the image reading unit waiting below the reading surface. Such image reading by the ADF 7 is carried out with the document cover 8 covering the document reading unit 6.

The printer 2 records an image on a recording sheet based on the image data read out by the scanner 3 or image data input from the external device. The printer 2 is a so-called ink-jet system image recording device (ink-jet recording device). The above ink-jet system is mere an example of an image recording system of the printer 2. A variety of image recording systems, such as an electrophotographic system and a thermal transfer system, can be adopted as the image recording system of the printer 2.

The multifunction device 1 is formed with an opening 11 on a front side thereof. The opening 11 is formed on a front side of the multifunction device 1, that is, on a front side of the printer 2. Inside the opening 11, the printer 2 includes a paper feed tray 14 and a paper ejection tray 15 which is disposed on top of the paper feed tray 14.

In addition, the multifunction device 1 has the control panel 4 on the front side thereof. The control panel 4 is used for operating the printer 2 and the scanner 3. The panel 4 includes a variety of operation keys 40 (40a, 40b, 40c, 40d, and 40e) and the LCD 41.

Among the variety of operation keys 40 (40a, 40b, 40c, 40d, and 40e), the operation key 40a is a menu screen key 40a used for displaying a menu screen (see FIG. 4(a)) on the LCD 41 of the multifunction device 1. The operation keys 40b are numerical keys 40b used for inputting numbers and signs. The operation keys 40c are direction keys 40c used for instructing movement of a cursor displayed on the LCD 41. The operation key 40d is a selection key 40d used for instructing selection of information indicated by the cursor, for example. The operation key 40e is an end key 40e used for instructing an end of the menu screen.

The LCD 41 is formed in a rectangular shape with a longitudinal direction (width direction) parallel to an arrow A direction. The LCD 41 has an aspect ratio of 3:8 where the width direction is 8. More specifically, two independent LCDs having a rectangular shape with an aspect ratio of 3:4 are integrally disposed adjacent to each other in the arrow A direction. However, in FIG. 1, the LCD 41 is illustrated by omitting such a detail.

As shown in FIG. 2, the multifunction device 1 includes a control unit 20 therein. When a prescribed instruction is input to the multifunction device 1, operation of the device 1 is controlled by the control unit 20 based on the instruction being input. The multifunction device 1 is capable of operating based on an instruction transmitted from a computer via a printer driver or a scanner driver, in addition to an instruction inputted from the control panel 4.

The multifunction device 1 includes a connection panel 70. The connection panel 70 is provided below the control panel 4 and above the opening 11. The connection panel 70 includes an USB terminal 71 and a slot unit 72. The USB terminal 71 is provided on a left side edge of the connection panel 70. The USB terminal 71 is a connector terminal that connects an external device by USB connection. Accordingly, the USB terminal 71 connects the multifunction device 1 to the external device in a communicable manner.

The connection panel 70 includes the slot unit 72 a right side edge thereof. The slot unit 72 includes a plurality of card slots. The card slots can be loaded with a memory card (card type memory). When the memory card is loaded in the card slot and image data is read out from the loaded memory card by the control unit 20, which will be described later, the read-out image data and information relating to the image data are displayed on the LCD 41 by the control unit 20 (refer to FIG. 2). Alternatively, an image that is selected arbitrary is recorded by the printer 2 on a recording sheet.

A schematic configuration of the control unit 20 is described with reference to FIG. 2. FIG. 2 is a block diagram showing the schematic configuration of the control unit 20 of the multifunction device 1. The control unit 20 integrally controls operation of the multifunction device 1 including the printer 2, the scanner 3, and the control panel 4.

As shown in FIG. 2, the control unit 20 is configured of a microcomputer primarily including a central processing unit (CPU) 21, a read-only memory (ROM) 22, a random access memory (RAM) 23, and an electrically erasable and programmable ROM (EEPROM) 24, which is a rewritable, nonvolatile storage device. The controller 20 is connected to an application specific integrated circuit (ASIC) 26 via a bus 25.

The CPU 21 is a central processing unit that controls integrally the multifunction device 1. The CPU 21 operates in accordance with a program stored in the ROM 22. The ROM 22 stores a program for controlling various operations of the multifunction device 1. For example, the ROM 22 stores a menu screen display program 22a as a program for executing menu screen display process as shown in FIG. 3. The RAM 23 is used as a storage area or a working area that temporarily stores various data used when the CPU 21 executes the program.

An EEPROM 24 includes a hierarchical structure memory 24a, a selected menu memory 24b, a mode setting memory 24c, an icon memory 24d, and a display style memory 24e.

The hierarchical structure memory 24a stores a name (title) of each menu for setting various functions equipped in the multifunction device 1 as a hierarchical structure. That is, each menu contained in a layer is linked to a directly beneath level menus.

For example, when names (titles) of zeroth to second menus included in a zeroth layer showing a highest layer are A, B, and C, "0¥0.A", "0¥1.B", and "0¥2.C" are stored in the hierarchical structure memory 24a. Here, the zeroth layer is highest layer. That is, as the layer is lower, a number of layer is increased. In addition, when D, E, and F are names (titles) of zeroth to second menus included in a first layer which is a layer immediately lower than "0¥0.A", "0¥0.A¥1¥0.D", "0¥0.A¥1.E", and "0¥0.A¥1¥2.F" are stored in the hierarchical structure memory 24a. Further, when G, H, and I are names (titles) of zeroth to second menus included in a second layer which is a layer immediately lower than "0¥0.A¥1¥0.D", and "0¥0.A¥1¥2¥0.G", "0¥0.A¥1¥0.D¥2¥1.H", "0¥0.A¥1¥0.D¥2¥2.I" are stored in the hierarchical structure memory 24a. Thus, the hierarchical structure memory 24a stores the names (titles) of menus clarifying the hierarchical structure of the menu from the highest layer.

The selected menu memory 24b stores a selected menu selected by the user from names (titles) of a plurality of menus in each layer. The CPU 21 can recognizes the name (title) of the selected menu selected by the user for each layer based on the selected menu stored in the selected menu memory 24b.

For example, when the menu name A is selected from the menus of zeroth layer, "0¥0.A" is stored in the selected menu memory 24b. When the menu name D is selected from the menus of the first layer, "0¥0.A¥1¥0.D" is stored in the selected menu memory 24b. In case the menu name G is selected from the second layer, "0¥0.A¥1¥0.D¥2¥0.G" is stored. That is, the selected menu memory 24b stores a name (title) of the menu that is currently selected by the user and names (titles) of menus that constructs the hierarchical structure from the highest layer to the layer of the currently selected menu. In other words, the selected menu memory 24b stores the names (titles) of menus clarifying the hierarchical structure of the menu from the highest layer.

The mode setting memory 24c stores a mode selected by the user from the menu screen. In the embodiment, a display style, which will be described later, of the menu screen is prepared from a first mode to a ninth mode. When the user selects a prescribed mode from the menu screen, the selected mode is stored in the mode setting memory 24c, and the menu screen is displayed in accordance with the selected mode. A display content of the menu screen in each mode will be described later.

The icon memory 24d stores icons in association with each menu name (title) constructing the hierarchical structure. Each icon indicates a content of corresponding menu name (title). This icon is displayed in association with the selected menu in case the fifth mode is selected, as described later.

The display style memory 24e stores a size of letters, a thickness of letters, a color (colors of letters and background), a font of letters, and a letter decoration. When one of the fourth mode, the sixth mode, and the seventh mode is selected, a selected menu is displayed in a display style, which is different from display styles of other menus, based on the size of letters, the thickness of letters, the color, the font of letters, and the letter decoration stored in the display style memory 24e. The display style stored in the display style memory 24e is capable of being set arbitrary by the user.

The ASIC 26 is connected to the printer 2, the scanner 3, a panel gate array 27 (panel GA 27), an LCD controller 28, the slot unit 72, a parallel interface 29 (parallel I/F 29), a USB terminal 71, a speaker 74 through an amplifier 73, a network control unit (NCU) 31, and a real time clock (RTC) 18. The ASIC 26 controls operation of the printer 2, the scanner 3, the control panel 4, and the slot unit 72 in accordance with an instruction from the CPU 21. (For example, the ASIC 26 controls operation of a motor (not shown) that drives the printer 2, an ink-jet recording head (not shown), a motor (not shown) that drives the ADF 7 of the scanner 3, and the image reading unit (not shown).) Since the printer 2, the scanner 3, and the slot unit 72 have well known in the art, thus detailed description for these devices is omitted.

The panel GA 27 controls the operation key 40 that inputs a desired instruction to the multifunction device 1. The LCD controller 28 controls screen display of the LCD 41. The parallel I/F 29 is used for sending and receiving data with an external computer via a parallel cable or a USB cable. The RTC 18 is a chip exclusively used for a clock. The RTC 18 is connected to a battery 18a capable of being activated even while the main power of the multifunction device 1 is not supplied.

The NCU 31 is connected to a modem 32. The NCU 31 is used for controlling a line, and is connected to a telephone line. The NCU 31 receives a call signal and a variety of signals sent from a telephone switchboard. In addition, the NCU 31 sends a dialing signal at the time of signal transmission corresponding to operation of the operation key 40 to the telephone switchboard. Also, the NCU 31 performs data communication such as sending and receiving of an analog sound signal when the telephone line is closed.

The modem 32 executes modulation and demodulation of facsimile data and electronic mail data. In addition, the modem 32 sends and receives various procedure signals for controlling transmission. The facsimile data is sent and received in accordance with a facsimile procedure by the NCU 31 and the modem 32.

Next, a menu screen display process will be described with reference to FIG. 3. FIG. 3 is a flowchart showing the menu screen display process. The menu screen display process is process for displaying a menu screen on the LCD 41. In case the menu screen display key 40a is pressed, the CPU 21 executes the menu screen display process in accordance with the menu screen display program 22a.

First of the menu screen display process, in S301 the CPU 21 performs an initial setting. In the initial setting, the CPU 21 initializes the selected menu memory 24b and the mode setting memory 24c, for example. In addition, the CPU 21 sets the cursor at an initially-set position. In the embodiment, the first mode is set at all times as a normally set mode. The normally set mode may be set as one of the second mode to the ninth mode. Then, based on the hierarchical structure stored in the hierarchical structure memory 24a, a menu list of the zeroth layer which is the highest layer are displayed on the LCD 41 (S302). Such menu list is displayed as shown in FIG. 4(a), for example.

FIG. 4(a) is a diagram showing a menu list M0 of the zeroth layer (the highest layer). In the embodiment, a width of the display region of the LCD 41 is indicated by W0, and the cursor is indicated by K. As shown in FIG. 4(a), in the menu list M0, names of menus are disposed sequentially from the top. That is, the screen of the LCD 41 juxtapose "0. Initial Setup" indicating initial setting, "1. General Setup" indicating basic setting, "2. Fax" indicating facsimile, "3. Copy" indicating copy, "4. Photo Capture" indicating photo-capture, "5. Print Reports" indicating print and reports, "6. Machine Info." indicating machine information, and "7. Scan" indicating a scanner in one column with respect to the height (vertical) direction orthogonal to the width direction of the LCD 41 sequentially from the top. That is, the menus in the zeroth layer are juxtaposed along a line parallel to the height direction of the LCD 41 from the top of the screen as a menu list.

In addition, below the menu list M0, numbers "1" to "9" indicating the first mode to the ninth mode are displayed in one row along a line parallel to the width direction of the LCD 41. When the cursor K is moved on any of the number of the "1" to "9" by operating the direction keys 40c and the selection key 40d is pressed, that is, one of the modes is selected, the menu screen is switched to a display corresponding to the mode.

As shown in FIG. 3, in S302 the CPU 21 controls on the LCD 41 to display the menu list M0 included in the zeroth layer, and proceeds to S303a. In S303a the CPU 21 determines whether any of the direction key 40c is pressed or not. If any of the direction key 40c is pressed (S303a Yes), the cursor K is moved in accordance with the pressed direction key 40c (S303), and then the CPU 21 proceeds to S304. If any of the direction key 40c is not pressed (S303a: No), the CPU 21 skips S303, and proceeds to S304.

In S304 the CPU 21 determines whether the selection key 40d is pressed or not (S304). If the selection key 40d is not pressed (S304: No), the CPU 21 proceeds to S312. If the selection key 40d is pressed (S304: Yes), the CPU proceeds to S305. In S305 the CPU 21 obtains information indicated by the cursor K. Then, in S306 the CPU 21 determines whether the obtained information is a mode selection or not. That is, the CPU 21 determines whether the user moves the cursor K to one of "1" to "9" on the screen and presses the selection key 40d. If the obtained information is not the mode selection (S306: No), the CPU 21 skips S307 and S308. Since only the first mode is a normally set mode, at least the first mode is set without obtaining information about the mode selection in S306. In other words, if in S304 the CPU 21 does not obtain information for mode selection from the beginning of the menu screen display process, the CPU 21 maintains the first mode that is a normally set mode in the embodiment. The mode selection is described later in detail.

In S309 the CPU 21 determines whether the information obtained in S305 is menu selection or not. If the obtained information is the menu selection (S309: Yes), in S310 the CPU 21 writes the selected menu name as a selected menu in the selected menu memory 24b, and the CPU 21 updates the selected menu memory 24b. By the selected menu stored in the selected menu memory 24b, the CPU 21 can recognizes a name of the selected menu selected by the user, even after the user proceeds operation and advances through the hierarchical structure.

Then, in S311 the CPU 21 updates the menu screen by controlling the LCD 41 to display a screen adding a new menu list to the menu lists that are displayed in S309. The new menu list belongs to a one lower grade layer than the layer of the menu list that includes the menu selected in S309. The screen of the LCD 41 displays menu lists that are displayed in S309 and the new menu list adjacent to the menu list that is displayed in S309 in the width direction. The new menu list is disposed adjacent to the menu list that includes the menu selected in S309 with respect to the width direction. For example, in case any of menu names is selected from the menu list M0 included in the zeroth layer, the CPU 21 stores the selected menu name in the selected menu memory 24b. Then, a menu list of the first layer that is a layer immediately lower than the selected menu is displayed next to (right hand side of) the menu list of the zeroth layer with respect to the width direction of the LCD 41.

Next, in S312 the CPU 21 determines whether the end key 40e is pressed or not. If the end key 40e is not pressed (S312: No), the CPU 21 proceeds to S303a again, and the process described above is repeated. If the end key 40e is pressed (S312: Yes), the CPU 21 ends the menu screen display process.

Here, transition of menu screens in case only the first mode is set will be described with reference to FIG. 4(a) to FIG. 4(d). As shown in FIG. 4(a), when the user operates the direction keys 40c, moves the cursor K to a section of "3. Copy" in the menu list M0 of the zeroth layer (highest layer), and presses the selection key 40d, a menu list M1 of the first layer immediately lower than the zeroth layer is displayed neighboring to the menu list M0 of the zeroth layer (the highest layer) with respect to the width direction of the LCD 41, as shown in FIG. 4(b).

The menu list M1 of the first layer in the screen of the LCD 41 disposes, as a menu list, "0. Quality" indicating image quality, "1. Enlarge/Reduce" indicating enlarge/reduce, "2. Page Layout" indicating a layout of a page, "3. Paper Type" indicating a type of a recording medium, "4. Paper Size" indicating a size of the recording medium, "5. Stack/Sort" indicating stack/sort, "6. Brightness" indicating brightness, "7. Contrast" indicating contrast, "8. Color Adjust Red" indicating color adjustment of red, "9. Color Adjust Green" indicating color adjustment of green, and "10. Color Adjust Blue" indicating color adjustment of blue in one column along a line parallel to the height direction of the LCD 41 from the top thereof.

In addition, the menu list M0 of the zeroth layer and the menu list M1 of the first layer are displayed such that each of widths with respect to the width direction of the LCD 41 (hereinafter "width with respect to the width direction of the LCD 41" is simply described by "width") of these menu lists is within a range of a width W1 which is substantially half of the width W0 of the LCD 41. Each name of the menu in the menu list M0 of the zeroth layer and the menu list M1 of the first layer is perfectly displayed in the width direction. That is, all letters of the menus in the menu lists M0 and M1 are perfectly displayed within the width direction W1. In other words, widths W0 and W1 in the width direction is long enough to entirely visibly indicate the names (titles) of menus.

Figure 4B:
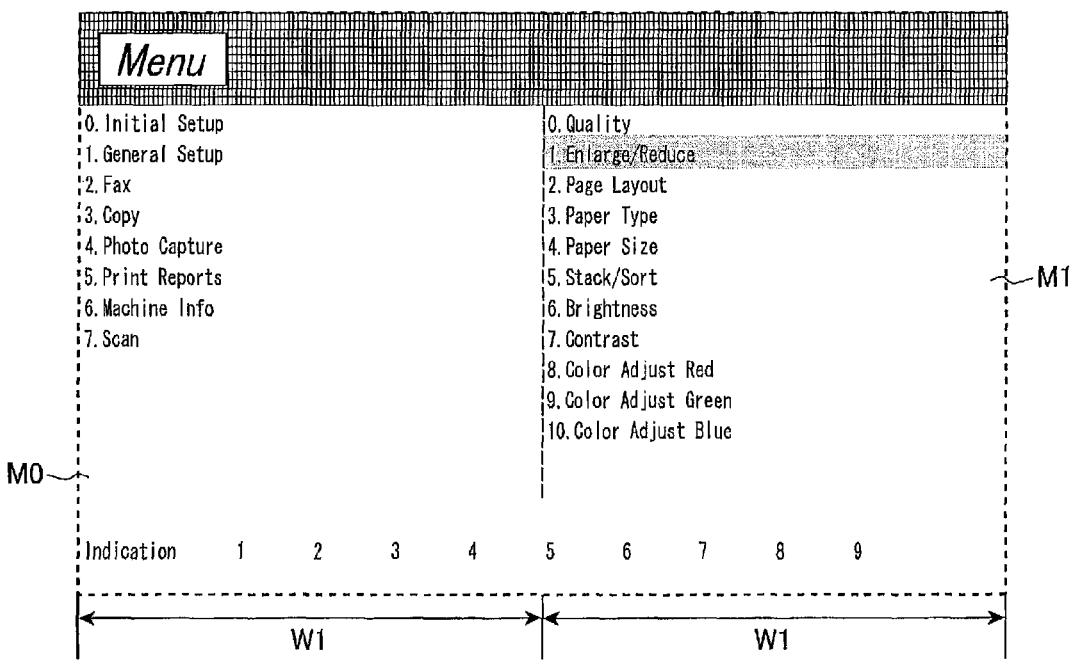
FIG. 4(b) is a diagram illustrating the menu screen when menu lists of zeroth layer and first layer are displayed.

Next, when as shown in FIG. 4(b) the user operates the direction keys 40c, moves the cursor K to a section of "1. Enlarge/Reduce" in the menu list M1 of the first layer, and presses the selection key 40d, as shown in FIG. 4(c), a menu list M2 of a second layer immediately lower than the first layer is displayed next to the menu list M1 of the first layer with respect to the width direction of the LCD 41.

The menu list M2 of the second layer in the screen of the LCD 41 displays numbers showing reduction/enlargement ratios, that is, "0.50%", "1.69% (A4 to A5)", "2.78% (LGL to LTR)", "3.83% (LGL to A4)", "4. 93% (A4 to LTR)", "5.97% (LTR to A4)", "6. 100%", "7. 104% (EXE to LTR)", "8. 142% (A5 to A4)", "9. 186% (4"×6" to LTR)", "10. 198% (4"×6" to A4)", "11. 200%", and "12. Custom (25-400%)", in one column with each number juxtaposed with respect to the height direction of the LCD 41 from the top.

In addition, the menu list M2 of the second layer is displayed with a width of the menu list M2 being within a range of the width W1 which is substantially half of the width W0 of the display region of the LCD 41. Thus, each menu names of the menu list M2 of the second layer is displayed perfectly in the width direction. That is, all letters of the menu names in the menu list M2 of the second layer are displayed perfectly in the width W1. On the other hand, the menu list M0 of the zeroth layer and the menu list M1 of the first layer are displayed with each of the width of these menu lists being within a range of a width W2 which is half of the width W1.

Figure 4C:
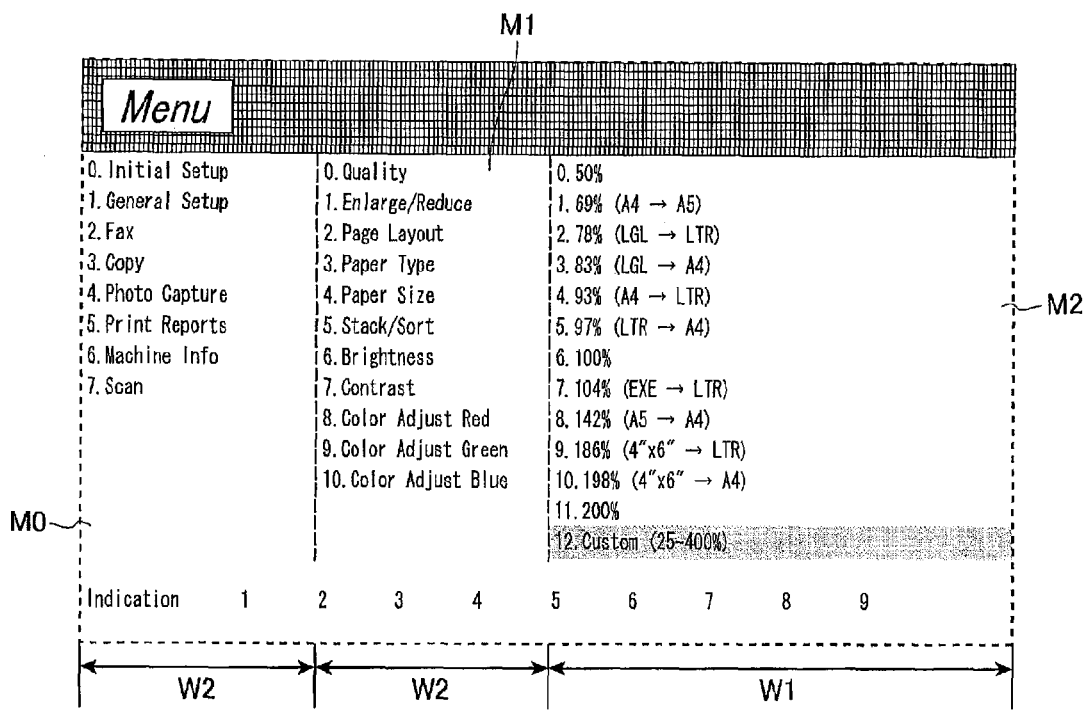
FIG. 4(c) is a diagram illustrating the menu screen when menu lists of zeroth layer to second layer are displayed.
Figure 4D:
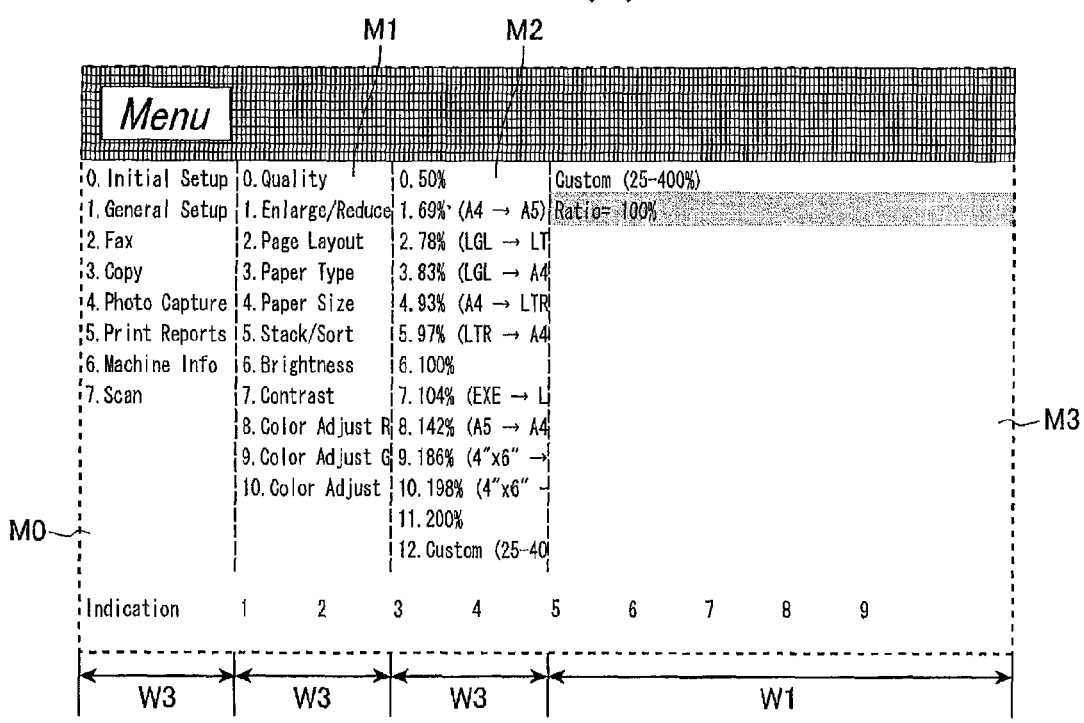
FIG. 4(d) is a diagram illustrating the menu screen when menu lists of zeroth layer to third layer are displayed.

Next, when as shown in FIG. 4(c) the user operates the direction keys 40c, moves the cursor K to a section of "12. Custom (25-400%)" in the menu list M2 of the second layer, and presses the selection key 40d, as shown in FIG. 4(d), a menu list M3 of a third layer immediately lower than the second layer is displayed next to the menu list M2 of the second layer with respect to the width direction of the LCD 41.

In the menu list M3 of the third layer, letters of "Custom (25-400%)" are displayed in one row disposed at one position with respect to the height direction of the LCD 41. Letters of "Ratio=100" are displayed in one row at another position with respect to the height direction. Menus "Custom (25-400%)" and "Ratio=100" are juxtaposed in the width direction of the LCD 41. In addition, the menu list M3 of the third layer is displayed in a manner that a width of the menu list is within a range of the width W1 which is half of the width W0 of the display region of the LCD 41. Thus, each menu name of the menu list M3 of the third layer is perfectly displayed along a line parallel to the width direction. That is, all letters of names of menus in the menu list M3 are displayed perfectly in a single row. On the other hand, the menu list M0 of the zeroth layer, the menu list M1 of the first layer, and the menu list M2 of the second layer are displayed in a manner that each of the widths of these menu lists is within a range of a width W3 which is ⅓ of the width W1.

As described above, in the first mode which is normally set mode, when a requested menu list requested by the user is displayed, displayed menu lists which have already been displayed are displayed with a reduced width. That is, the menu lists that belong to the layer higher than the layer of the requested menu list are displayed in the reduced width. Thus, even in a limited display region, all of the requested menu list and the menu lists of higher layers that leads to the requested menu list can be displayed. Accordingly, all of the menu lists of higher layers leading to the requested menu list can be checked on the same screen.

Next, the mode selection in S306-S308 will be described in detail. In S306-S308, one of the zeroth to ninth mode is selected.

That is, in S306, the CPU 21 deternubes that the mode selection is selected (S306: Yes), in S307 the CPU 21 stores a selected mode in the mode setting memory 24c, and sets the selected mode. In S308 the CPU 21 switches the menu screen to a display corresponding to the set mode.

Subsequently, the CPU 21 performs processes from S309 as similar to the above description. Here, in S311, if a menu list of a layer immediately lower than the layer of a selected menu ins S309 is displayed, the menu name selected in S309 is displayed in a form in accordance with the mode being set in S306.

Here, the second to ninth modes will be described reference to FIGS. 5(a) to 13(c). At first, the menu screen currently displays a state as shown in FIG. 4(d). That is, only the first mode is set in the mode setting memory 24c. As shown in FIG. 4(d), "3. Copy" is selected in the zeroth layer, "1. Enlarge/Reduce" is selected in the first layer, and "12. Custom (25-400%)" is selected in the second layer. Thus, the selected menu memory 24b stores the above selected menu, "3. Copy", "1. Enlarge/Reduce", "1. Enlarge/Reduce", and "12. Custom (25-400%)", as the selected menus.

Figure 5A:
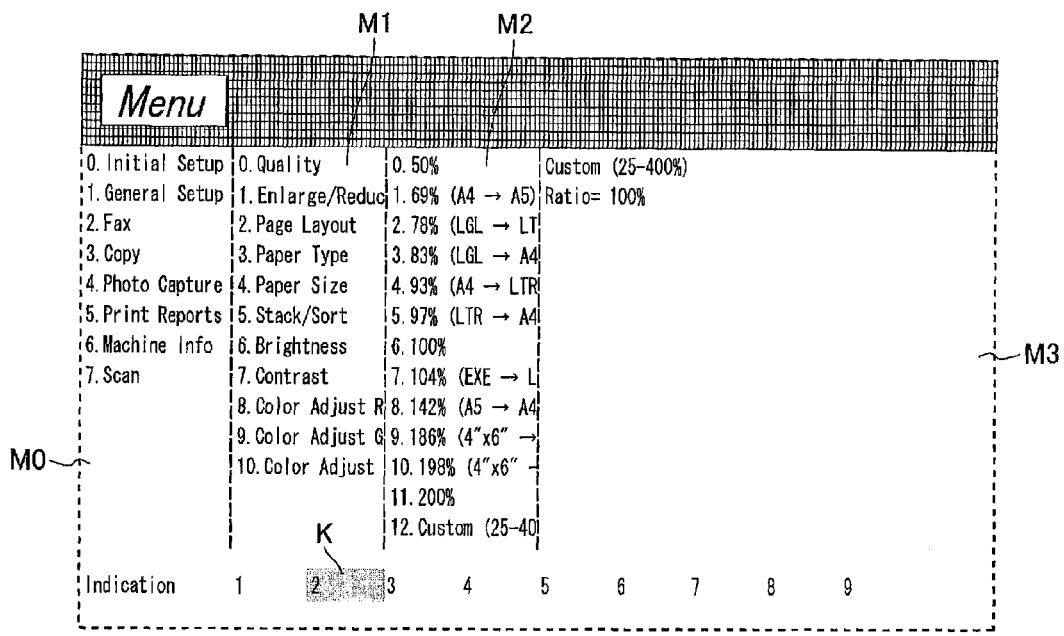
FIG. 5(a) is a diagram illustrating a transition of the menu screen from a first mode to a second mode.
Figure 5B:
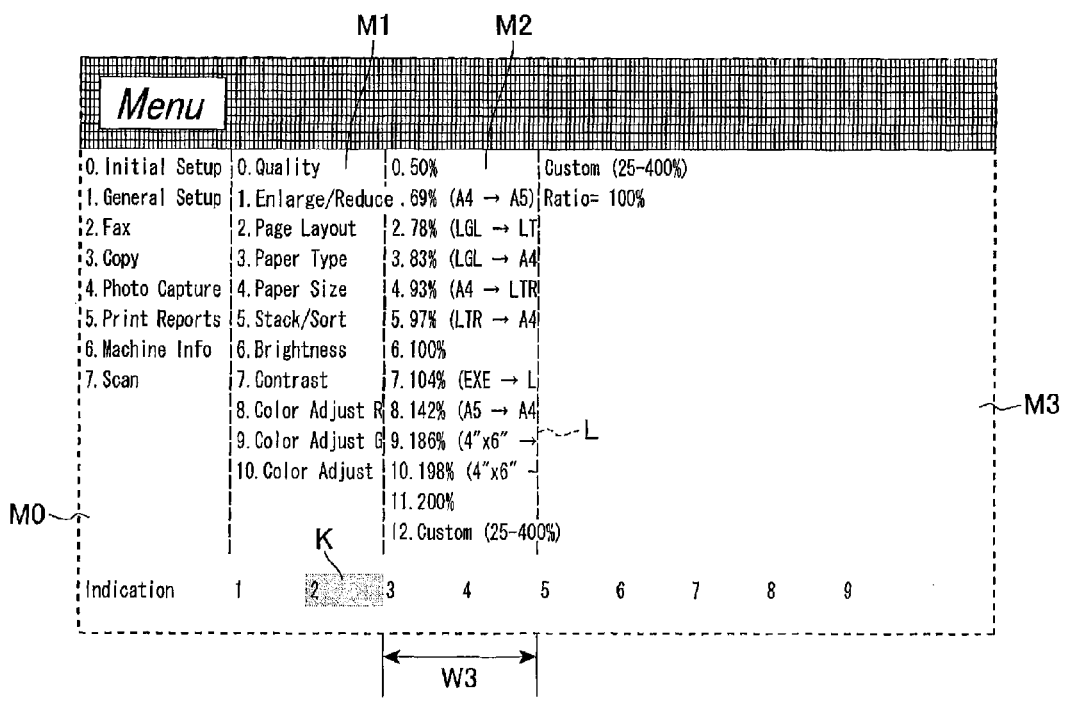
FIG. 5(b) is a diagram illustrating the menu screen when the second mode is selected.

First, the second mode will be described with reference to FIGS. 5(a)-5(d). When the user intend to set the second mode from the state as shown in FIG. 4(d), the user operates the direction key 40c to move the cursor K to a section of "2" as shown in FIG. 5(a), and presses the selection key 40d. Subsequently, as shown in FIG. 5(b) the second mode is set, and "12. Custom (25-400%)" in the menu list M2 of the second layer is displayed in a manner projecting to a display region of the menu list M3 of the third layer from the display region of the menu list M2.

That is, the width W3 of the menu list M2 of the second layer is reduced to a width smaller than the widths W1 or W2. Here, the widths W1 or W2 are capable of displaying perfectly each of the menu name included in the menu list M2 of the second layer in a single line. However, "12. Custom (25-400%)" of the menu list M2 of the second layer no longer fits in a range of the width W3 of the menu list M2 of the second layer. "12. Custom (25-400%)" of the menu list M2 of the second layer is displayed in a manner projecting to the display region of the menu list M3 of the third layer across a boundary line L between the menu list M2 of the second layer and the menu list M3 of the third layer. Here, a boundary line is depicted at each boundary of the display regions on the screen of the LCD 41. The boundary line L1 is depicted at the boundary between the display region of the menu list M2 and the display region of the menu list M3.

In other words, when the menus is selected in succession while advancing to a deeper level of layers, the items designated by the designating unit are displayed in sub region of the display region to be arranged along a line parallel to the width direction, the CPU 11 controls the LCD 41 to display each (name) title of menus to extend beyond an adjacent display region so that the each name (title) of the menus is entirely visually indicated in the screen.

As described above, in the second mode, when the selected menu of each layer does not fit in a display region of each layer in the width direction due to the reduction of a width length of the menu list in each layer, the selected menu is displayed in a manner projecting to an adjacent, with respect to the width direction, display region.

Accordingly, even if the width of the menu list M2 of the second layer is reduced, only "12. Custom (25-400%)" that is the selected menu in the reduced menu list M2 can be displayed completely along a line parallel to the width direction of the LCD 41. The selected menu ("12. Custom (25-400%)") can be checked more easily than other menus. Here, the full name of other menus are not displayed perfectly (for example, "7. 104% (EXE to LTR)", "8. 142% (A5 to A4)", "9. 186% (4"x6" to LTR)", "10. 198% (4"x6" to A4)", and "11. 200%" in the menu list M2 of the second layer).

FIG. 5(c) illustrates where, in the second mode, a plurality of the selected menus to be projecting for display are located on the same line along a line parallel to the width direction of the LCD 41. FIG. 5(c) shows a menu list Mx of an x-th layer and a menu list My of a y-th layer immediately lower than the menu list Mx of the x-th layer. The y-th layer is lower than the x-th layer. The y-th layer is immediately higher layer than the currently selected menu.

As shown in FIG. 5(c), a name of a first menu "1. XXXXXXX" is displayed in the menu list Mx and a name of a first menu "1. YYYYYYYY" is displayed in the menu list My adjacent to "1. XXXXXXX" on the same line. Here, both of "1. XXXXXXX" and "1. YYYYYYYY" are selected as selected menus. On the screen of the LCD 41, "1.XXXXXXX" of the menu list Mx is not projecting to an area of the menu list My. That is, only "1. YYYYYYYY" of the menu list My which is a lower layer of the x-th layer is displayed in a manner projecting to an adjacent display region. Accordingly, only the selected menu ("1. YYYYYYYY") belonging to a layer immediately higher than a currently requested (selected) menu list can be reliably completely displayed along the line parallel to the width direction of the LCD 41.

Instead of the case described in FIG. 5(c), when a plurality of the selected menus to be projecting are located on the same line in the width direction of the LCD 41, the plurality of the selected menus may be displayed as shown in FIG. 5(d).

A name of a first menu "1. XXXXXXX" is displayed in the menu list Mx and a name of a first menu "1. YYYYYYYY" is displayed in the menu list My adjacent to "1. XXXXXXX" on the same line. Here, both of "1. XXXXXXX" and "1. YYYYYYYY" are selected as selected menus.

In this case, as shown in FIG. 5(d), on the screen of the LCD 41, "1. XXXXXXX" of the menu list Mx is projecting to an area of the menu My. "1. YYYYYYYY" of the menu list My which is a lower layer of the x-th layer is displayed by switching a position thereof to a position of "2. DDD". Here, "2. DDD" is displayed below "1. YYYYYYYY" in a height direction of the menu list My when the menu of y-th layer is not selected (see FIG. 5(c)). Therefore, only the selected menus ("1. XXXXXXX" and "1. YYYYYYYY") can be displayed completely in the width direction of the LCD 41. That is, the position of the name of the selected menu is shifted in the height direction preventing from juxtaposing each name of the selected menus in a line parallel to the width direction. In other words, the CPU 11 changes a position in the height direction of at least one of the names (titles) of menus to prevent interference to the name (title) of menu displayed in adjacent display region. In this manner, the selected menus can be displayed so that the selected menus can be checked more easily than the other menus, and a history of selection can be checked at a glance.

Figure 6B:
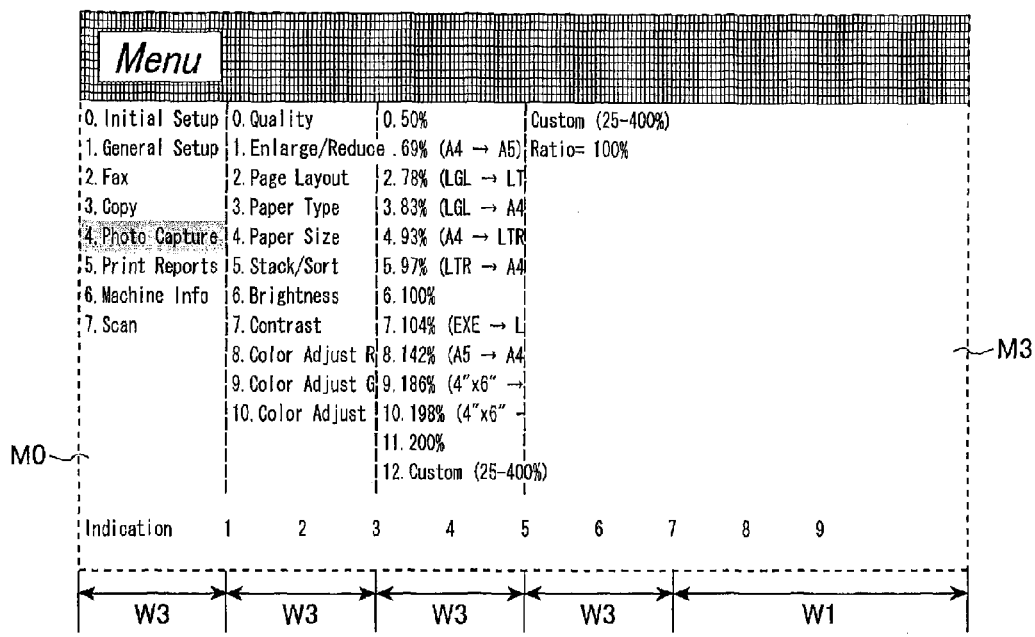
FIG. 6(b) is a diagram illustrating a transition of the menu screen in the second mode.
Figure 6C:
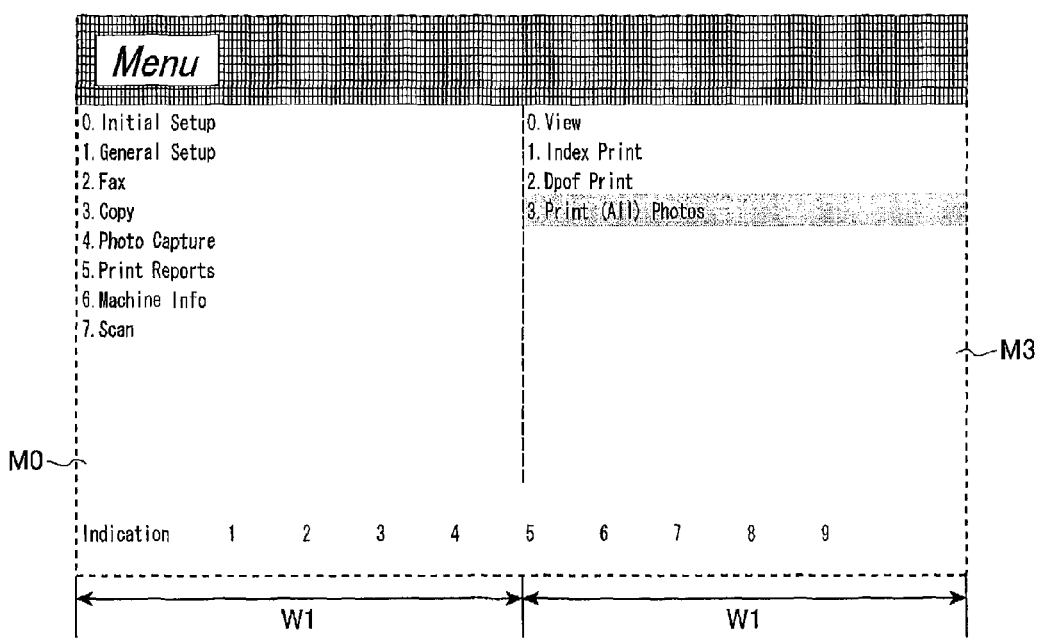
FIG. 6(c) is a diagram illustrating a transition of the menu screen in the second mode when a selected menu is updated.

Next, a case of selecting another menu name in the second mode is described with reference to FIGS. 6(a)-6(c). FIG. 6(a) shows a current menu screen which displays the same menus as shown in FIG. 5(c).

The user operates the direction keys 40c to move the cursor K to a position of a desired menu name from the state shown in FIG. 5(b). FIG. 6(a) shows a state where the cursor K is moved to "Ratio=100%" of the menu list M3 of the third layer. FIG. 6(b) shows a state where the cursor K is moved further to "4. Photo Capture" in the menu list M0 of the zeroth layer from the state shown in FIG. 6(a).

As described above, a display content of the menu screen and a width of each menu list do not change from the state shown in FIG. 5(b) only by moving the cursor K. Accordingly, an error in selection can be restricted during an operation advancing through the hierarchical structure.

On the other hand, as shown in FIG. 6(b), when the selection key 40d is pressed after the cursor K is moved to "4. Photo Capture" of the menu list M0 of the zeroth layer, a display of the menu screen is switched as shown in FIG. 6(c).

That is, each of the menu lists M1 to M3 of the first through third layers which are lower layers relating to "3. Copy" of the zeroth layer is erased. Here, "3. Copy" is the previously selected menu in the menu list M0 of the zeroth layer. Then, the menu list M1 of the first layer which is immediately lower than "4. Photo Capture" of the zeroth layer is displayed with the width W1 adjacent to the menu list M0 of the zeroth layer with respect to the width direction of the LCD 41.

In addition, "3. Copy" of the zeroth layer, "1. Enlarge/Reduce" of the first layer, "12. Custom (25-400%)" of the second layer that has been stored in the selected menu memory 24b as the selected menus are erased from the selected menu memory 24b. Then, "4. Photo Capture" selected in the zeroth layer is newly stored in the selected menu memory 24b.

Subsequently, the hierarchical structure will be displayed in accordance with an instruction of the user as described with reference to FIGS. 4(a)-4(d). In the second mode the selected menus stored in the selected menu memory 24b are displayed in a manner projecting to a display region of an adjacent menu list, when the selected menus do not fit in a width of a menu list in which the selected menus are displayed.

Figure 7A:
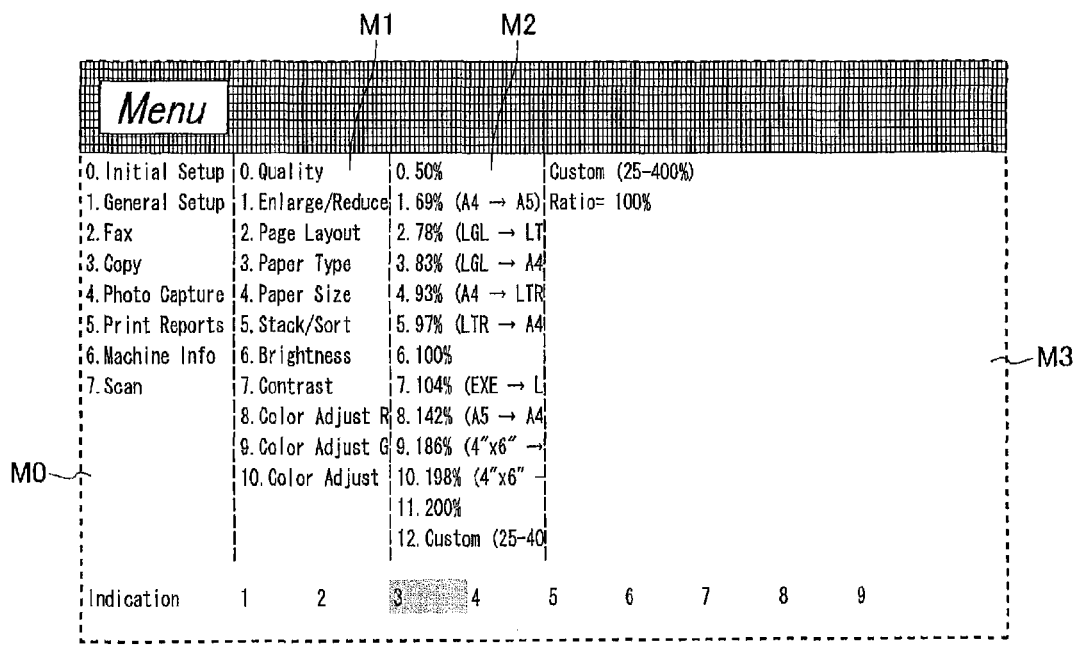
FIG. 7(a) is a diagram illustrating a transition of the menu screen from the first mode to a third mode.
Figure 7B:
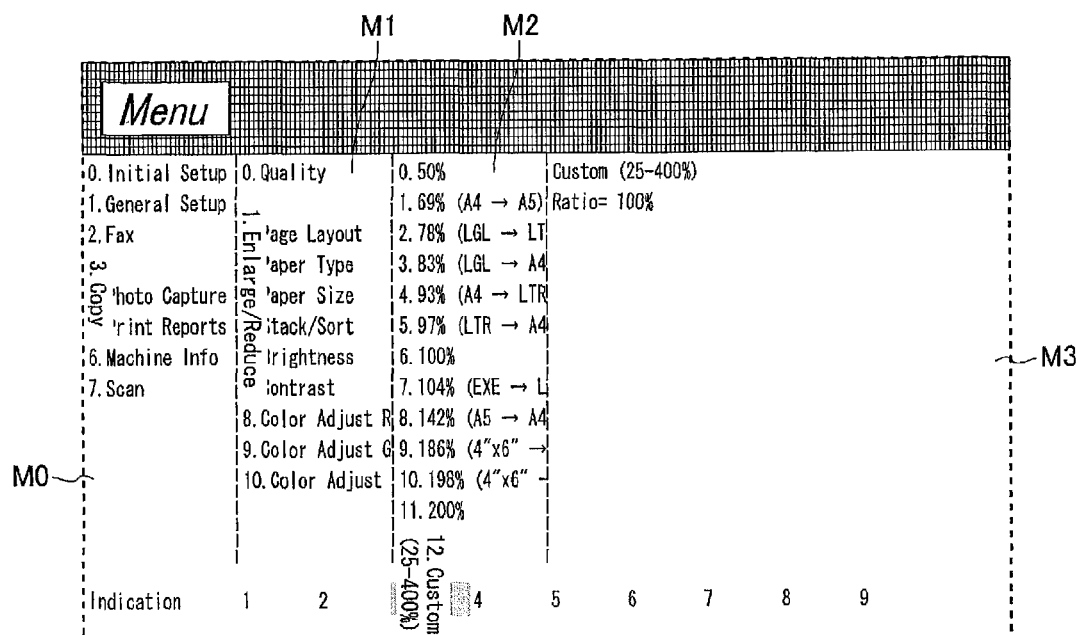
FIG. 7(b) is a diagram illustrating the menu screen when the third mode is selected.

Next, the third mode will be described with reference to FIGS. 7(a)-7(b). When the user intend to select the third mode from the state shown in FIG. 4(d), the user, as shown in FIG. 7(a), operates the direction keys 40c to move the cursor K to a section of "3" and presses the selection key 40d. Then, the CPU 21 sets the third mode. As shown in FIG. 7(b), each name of the menus is displayed along a line parallel to the height direction of the LCD 41. That is, the screen of the LCD 41 displays "3. Copy" which is the selected menu of the zeroth layer, "1. Enlarge/Reduce" which is the selected menu of the first layer, and "12. Custom (25-400%)" which is the selected menu of the second layer with each names being along the line parallel to the height direction of the LCD 41. In other words, these selected menus are displayed in a state being rotated from a direction in which other menu names are displayed. That is, the selected menus are written along a line parallel to the vertical direction that is rotated in 90 degrees from the width direction. Each of other menus is displayed along a line parallel to the width direction. According to the third mode, the selected menus can easily be identified from other menu names, and a history of selection can be checked at a glance.

Subsequently, the hierarchical structure will be displayed in accordance with an instruction of the user in a similar manner as described with reference to FIGS. 4(a)-4(d). For example, when the selection of "12. Custom (25-400%)" is cancelled and another menu is selected in the third mode, "12. Custom (25-400%)" is no longer displayed in a rotated manner, that is "12. Custom (25-400%)" is displayed along a line parallel to the width direction of the LCD 41 and the selected menu is displayed in a rotated manner.

Figure 8A:
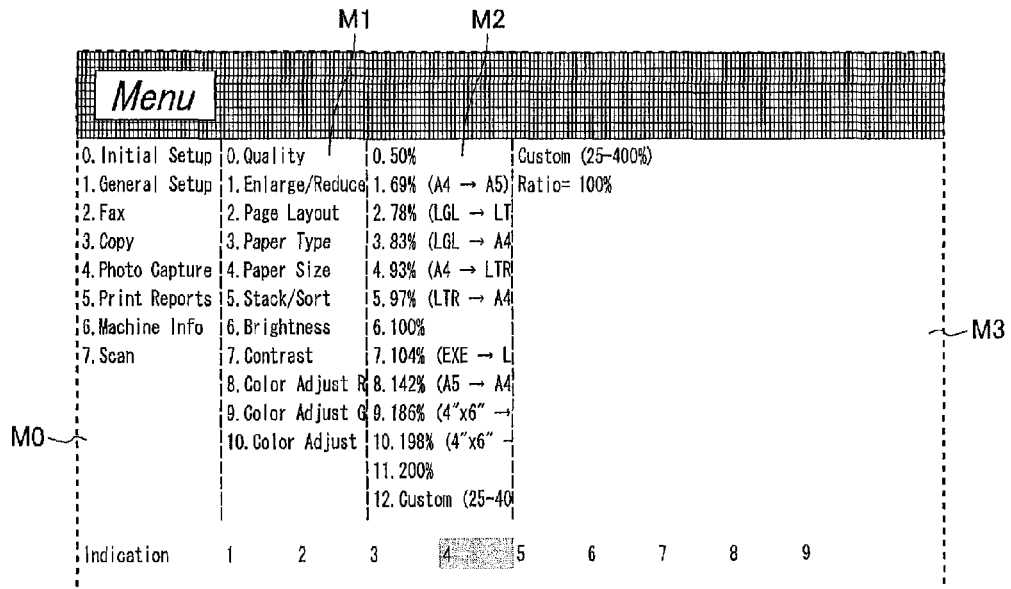
FIG. 8(a) is a diagram illustrating a transition of the menu screen from the first mode to a fourth mode.
Figure 8B:
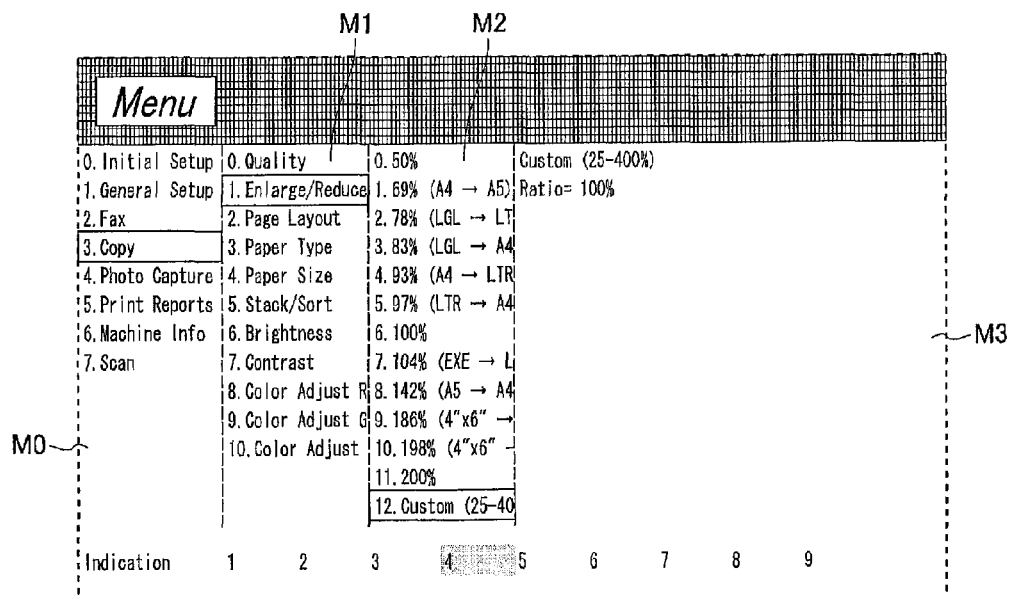
FIG. 8(b) is a diagram illustrating the menu screen when the fourth mode is selected.

Next, the fourth mode is described with reference to FIGS. 8(a)-8(b). When the user intend to select the fourth mode from a state shown in FIG. 4(d), as shown in FIG. 8(a) the user operates the direction keys 40c to move the cursor K to a section of "4" and presses the selection key 40d. Then, the CPU 21 sets the fourth mode. As shown in FIG. 8(b), the screen of the LCD 41 is displayed with frames enclosing "3. Copy" which is the selected menu of the zeroth layer, "1. Enlarge/Reduce" which is the selected menu of the first layer, and "12. Custom (25-400%)" which is the selected menu of the second layer. According to the fourth mode, the selected menus can easily be identified from other menu names, and a history of selection can be checked at a glance.

Subsequently, the hierarchical structure will be displayed in accordance with an instruction of the user in a similar manner as described with reference to FIGS. 4(a)-4(d). For example, when the selection of "12. Custom (25-400%)" is cancelled and another menu is selected in the fourth mode, "12. Custom (25-400%)" is no longer displayed by being enclosed by the frame, and the selected menu is displayed in a manner enclosed by frame.

In the fourth mode, the selected menu is displayed in a display style stored in the display style memory 24e. As long as the display style of the selected menu is different from a display style of other menus, the display style of the fourth mode is not limited to the display style that displays the selected menu enclosed by frame. For example, the screen of the LCD 41 displays the selected menu having a different display style from other menu by any of a color of the selected menu, a font, other letter decorations, and a background color.

Figure 9A:
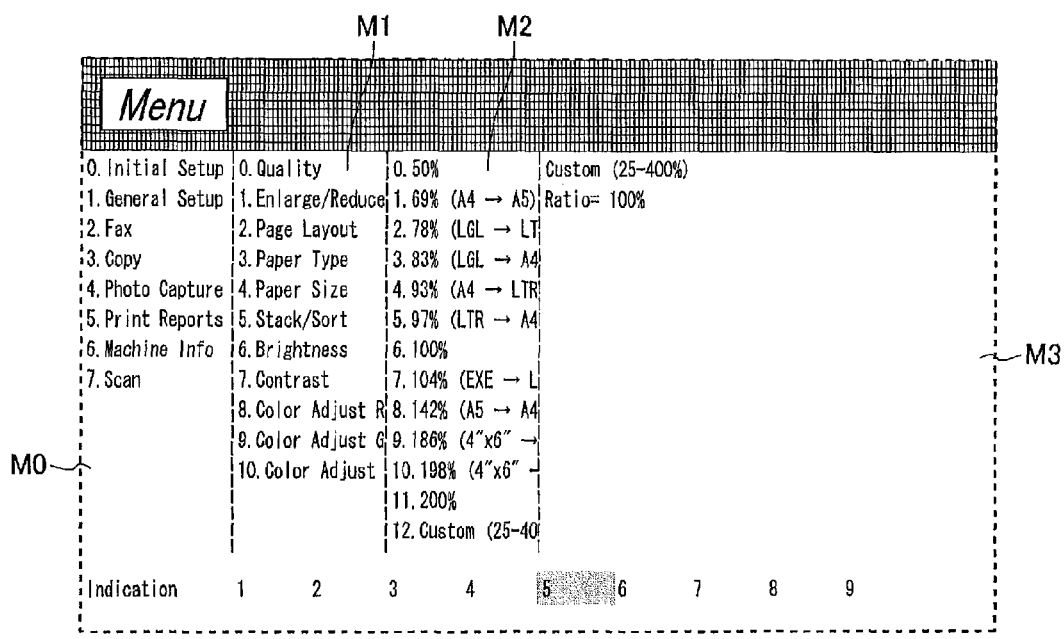
FIG. 9(a) is a diagram illustrating a transition of the menu screen from the first mode to a fifth mode.
Figure 9B:
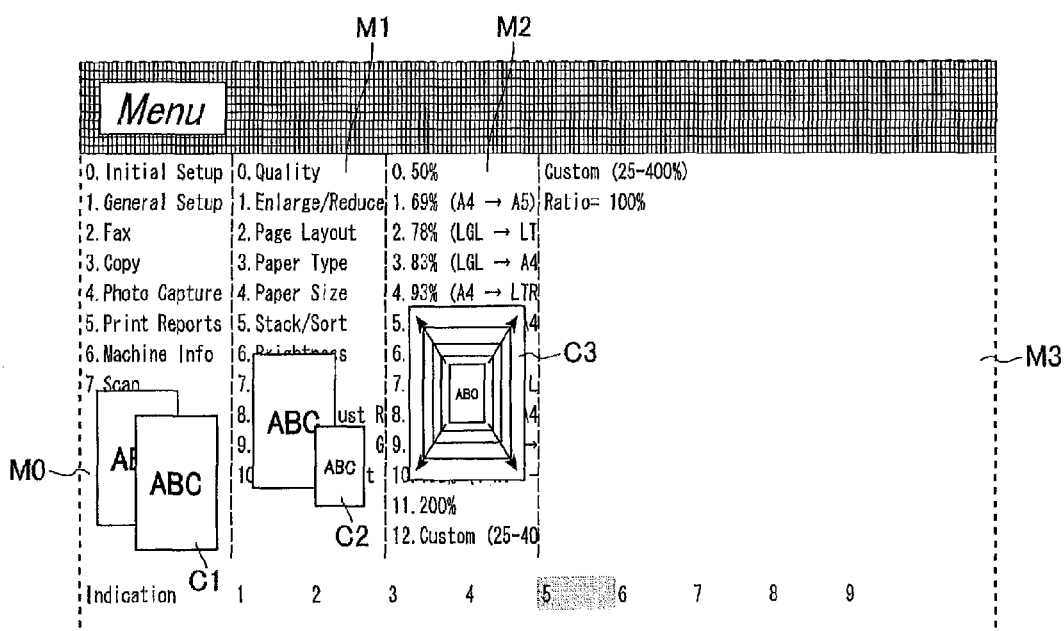
FIG. 9(b) is a diagram illustrating the menu screen when the fifth mode is selected.

Next, the selection of the fifth mode is described with reference to FIGS. 9(a)-9(b). When the user intend to select the fifth mode from the state shown in FIG. 4(d), as shown in FIG. 9(a) the user operates the direction keys 40c to move the cursor K to a section of "5", and presses the selection key 40d. Then, the CPU 21 sets the fifth mode. As shown in FIG. 9(c) the display region of the menu M0 shows an icon C1 indicating the selected menu "3. Copy" of the zeroth layer, the display region of M1 shows an icon C2 indicating the selected menu "1. Enlarge/Reduce" of the first layer, and the display region of the menu M2 shows an icon C3 indicating the selected menu "12. Custom (25-400%)" of the second layer. These icons are displayed in association with the selected menus. The user can check icons more quickly than letters. Accordingly in fifth mode a history of selection can be checked even more quickly.

Subsequently, the hierarchical structure will be displayed in accordance with an instruction by the user in a similar manner as described with reference to FIGS. 4(a)-4(d). For example, when the selection of "12. Custom (25-400%)" is cancelled and another menu is selected in the fifth mode, an icon indicating "12. Custom (25-400%)" is no longer displayed, and an icon indicating the selected menu is displayed.

Figure 10A:
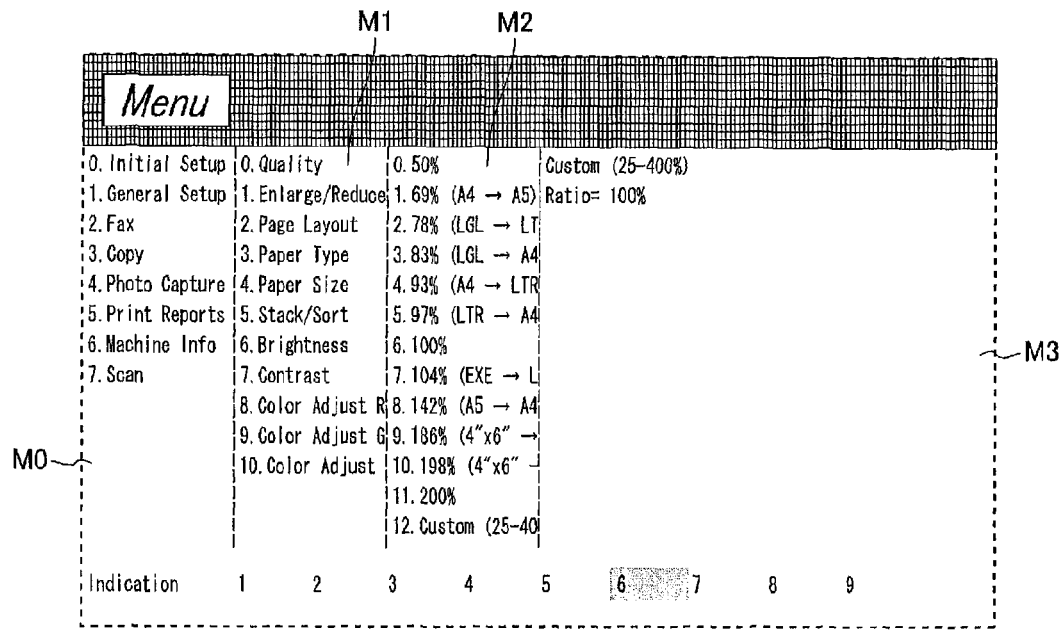
FIG. 10(a) is a diagram illustrating a transition of the menu screen from the first mode to a sixth mode.
Figure 10B:
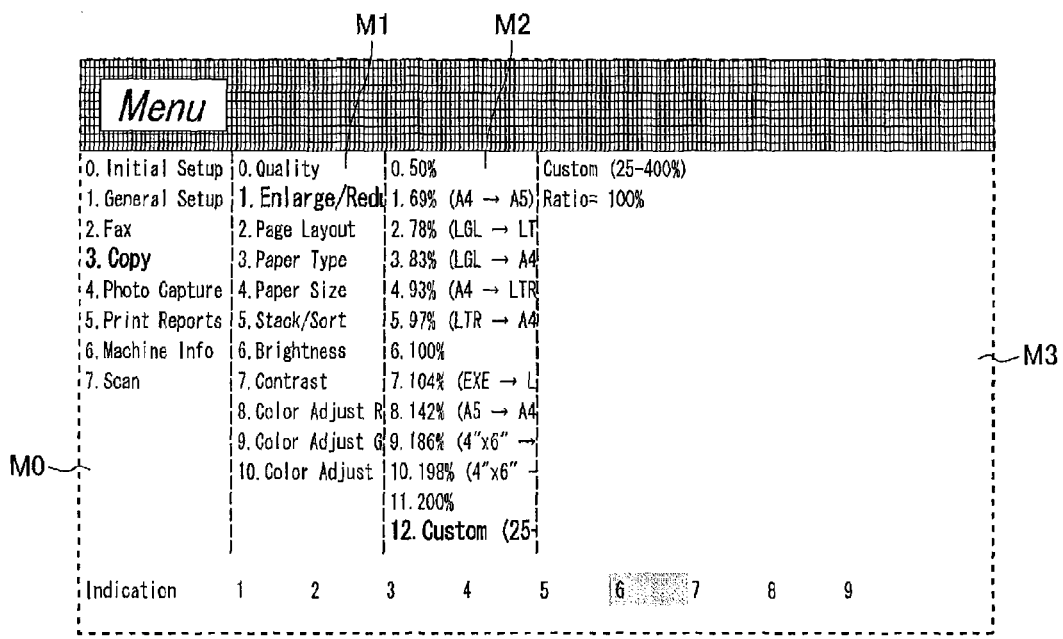
FIG. 10(b) is a diagram illustrating the menu screen when the sixth mode is selected.

Next, the sixth mode is described with reference to FIGS. 10(a)-10(d). When the user intend to select the sixth mode from the state shown in FIG. 4(d), as shown in FIG. 10(a) the user operates the direction keys 40c to move the cursor K to a section of "6", and presses the selection key 40d. The CPU 21 sets the sixth mode. In the sixth mode, the screen of the LCD 41 displays enlarged letters for the names of the selected menus. The enlarged letters for the names of the selected menus is larger than names of other menus. As shown in FIG. 10(b), the selected menu "3. Copy" of the zeroth layer, the selected menu "1. Enlarge/Reduce" of the first layer, and the selected menu "12. Custom (25-400%)" of the second layer are displayed with letters larger than letters of other menu names. According to the sixth mode, the selected menus can easily be recognized from other menu names, and a history of selection can be checked at a glance.

Subsequently, the hierarchical structure will be displayed in accordance with an instruction by the user in a similar manner as described with reference to FIGS. 4(a)-4(d). For example, the selection of "12. Custom (25-400%)" is cancelled and another menu is selected in the sixth mode, a size of the letters of "12. Custom (25-400%)" becomes a normal size, and a size of letters of the selected menu becomes large.

Figure 11A:
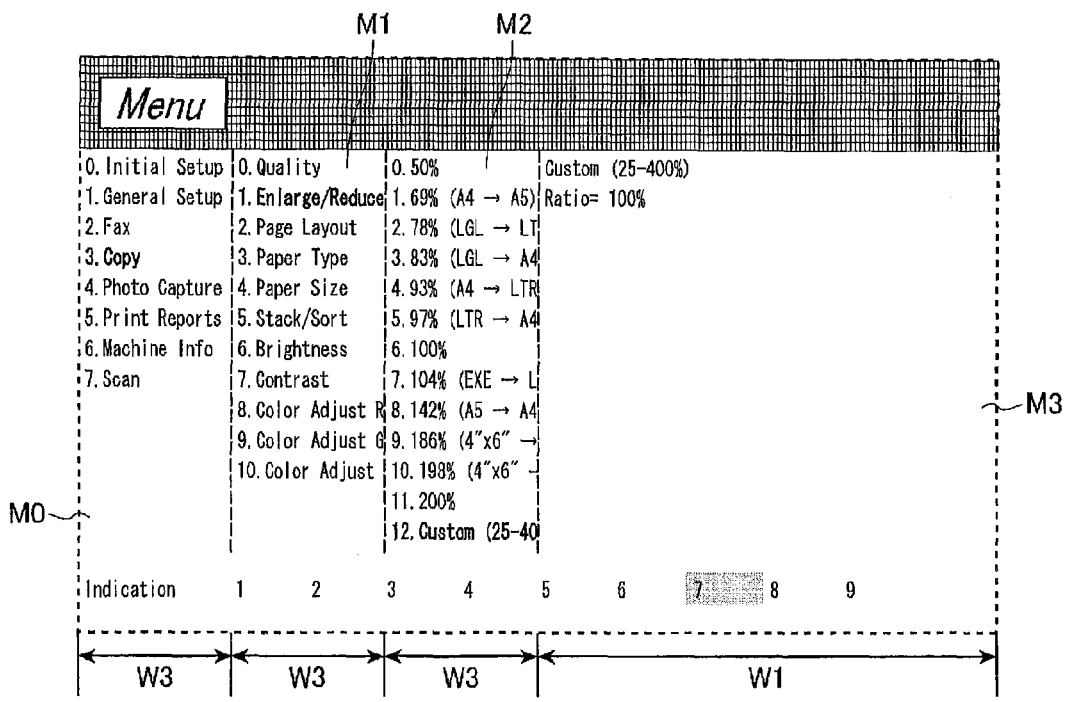
FIG. 11(a) is a diagram illustrating a transition of the menu screen from the first mode to a seventh mode.
Figure 11B:
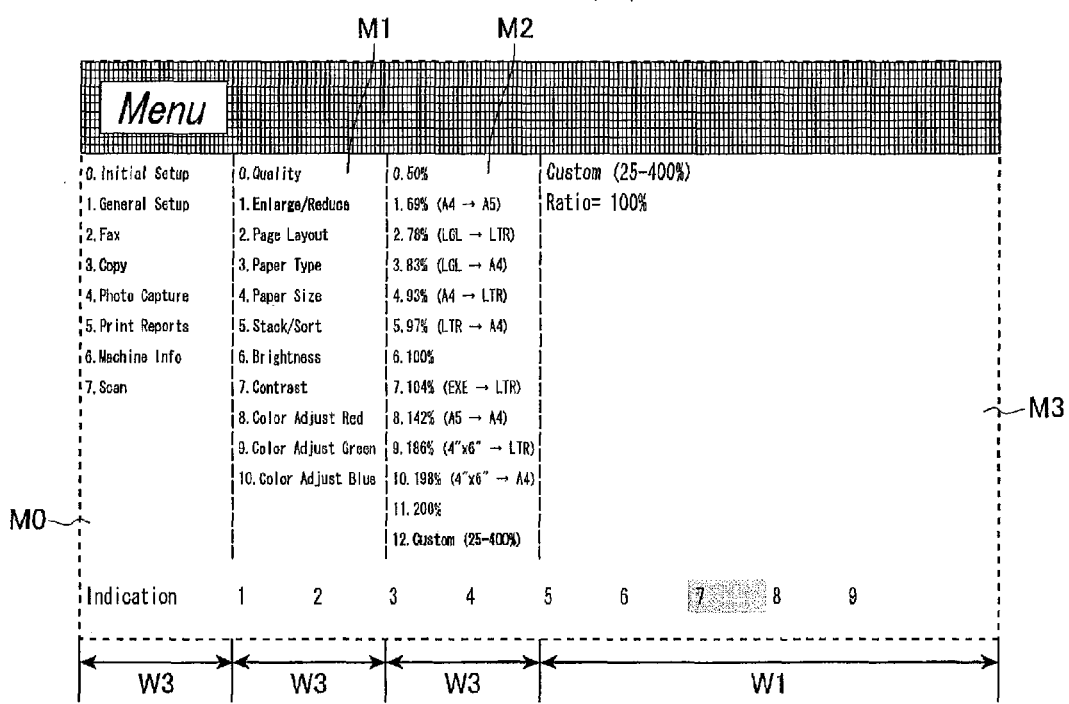
FIG. 11(b) is a diagram illustrating the menu screen when the seventh mode is selected.

Next, the seventh mode is described with reference to FIGS. 11(a)-11(b). When the user intend to select the seventh mode from the state shown in FIG. 4(d), as shown in FIG. 11(a), the user operates the direction keys 40c to move the cursor K to a section of "7", and presses the selection key 40d. Then, the CPU 21 sets the seventh mode. In the seventh mode the letter sizes of the selected menu is reduced such that the name of the selected menu can be displayed perfectly in a range of width W3. That is, in the seventh mode, all letters of the selected menu are displayed within the width W3 by reducing the letter size of the selected menu. More specifically, as shown in FIG. 11(b) the selected menu "3. Copy" of the zeroth layer, the selected menu "1. Enlarge/Reduce" of the first layer, and the selected menu "12. Custom (25-400%)" of the second layer are displayed with a letter size of each of the menu names being reduced so that the selected menus can fit in a range of the width W3 of each of the menu lists. That is, each menu name in the menu lists is displayed according to the number of menu lists displayed in the LCD 41.

As the number of displayed menu lists becomes large, a width of each of the displayed menu lists becomes small. However, in seventh mode, as the number of the displayed menu lists becomes large, letters of each menu name in the displayed menu lists become smaller. In this manner, even if the number of the displayed menu lists becomes large, letters of each menu name in the displayed menu lists can be displayed completely.

Subsequently, the hierarchical structure will be displayed in accordance with an instruction of the user in a similar manner as described with reference to FIGS. 4(a)-4(d). For example, the selection of "1. Enlarge/Reduce" of the first layer is cancelled and another menu is selected in the seventh mode, the second layer is no longer displayed, and a width of each menu list becomes W2, and letters of each menu name are enlarged to an extent fitting in a range of W2.

Figure 12A:
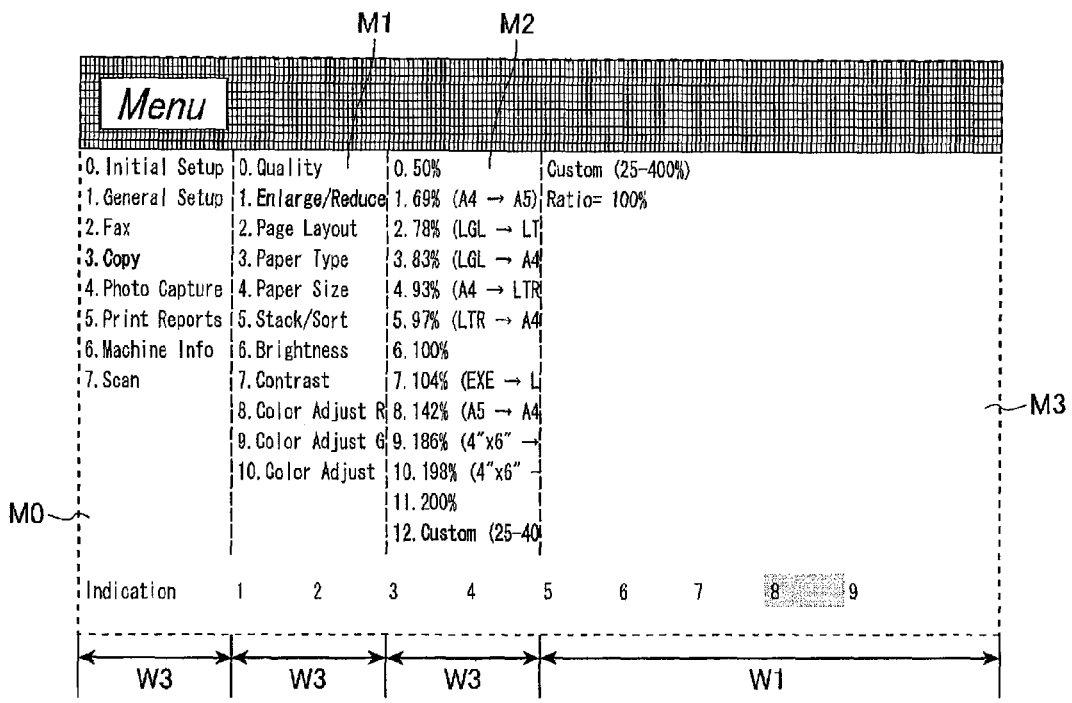
FIG. 12(a) is a diagram illustrating a transition of the menu screen from the first mode to an eighth mode.
Figure 12B:
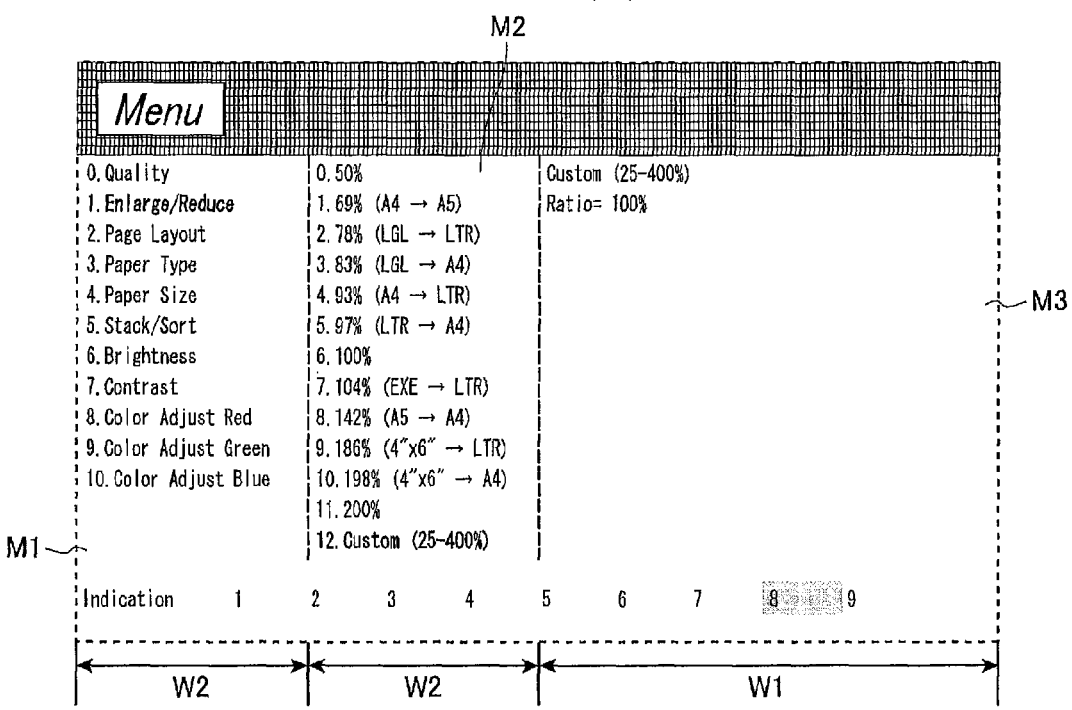
FIG. 12(b) is a diagram illustrating the menu screen when the eighth mode is selected.

Next, the eighth mode is described with reference to FIGS. 12(a)-12(c). When the user intend to select the eighth mode from the state shown in FIG. 4(d), as shown in FIG. 12(a) the user operates the direction keys 40c to move the cursor K to a section of "8" and presses the selection key 40d. Then, the CPU 21 sets the eighth mode. As shown in FIG. 12(b), the menu list M0 of the zeroth layer becomes hidden from the screen of the LCD 41. Then, the width of the menu list M1 of the first layer and the width of the menu list M2 of the second layer are enlarged from W3 to W2.

Figure 12C:
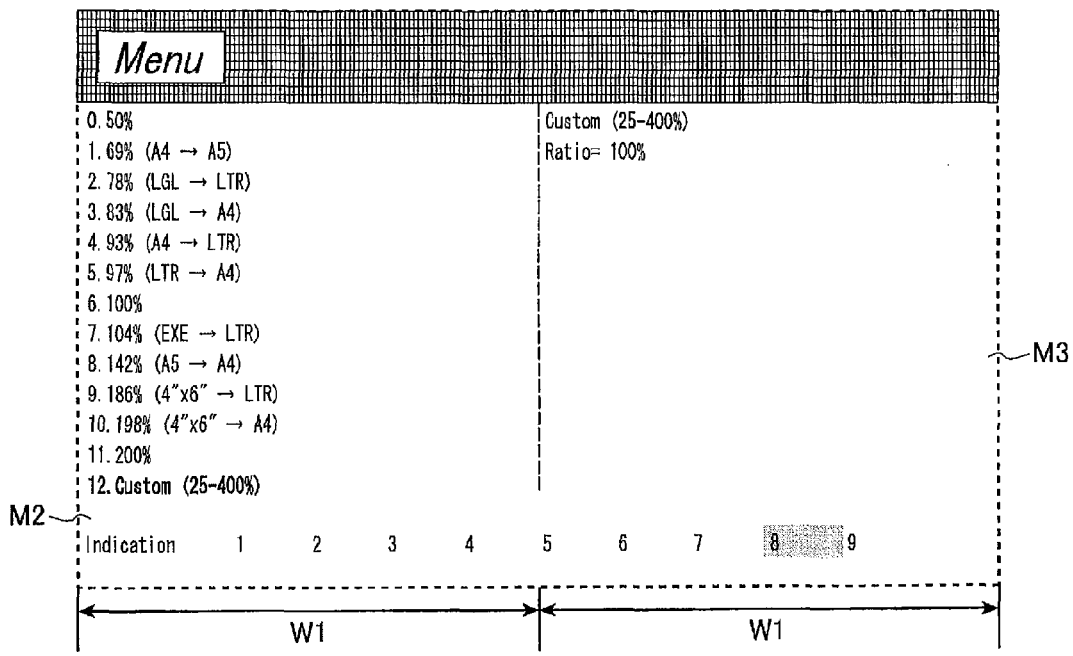
FIG. 12(c) is a diagram illustrating the menu screen when a selection key is pressed in the eighth mode.

In addition, when the user presses the selection key 40d again with the cursor K being positioned at "8" section, the menu list M1 of the first layer becomes hidden from the screen of the LCD 41, as shown in FIG. 12(c). Then, the width of the menu list M2 of the second layer is enlarged from W2 to W1.

As shown in FIG. 4(d), since the first mode displays the menu list M0 of the zeroth layer, the screen of the LCD 41 displays the menu list M1 of the first layer and the menu list M1 within the range of the width W3. However, in the eighth mode which hides the menu list M0 of the zeroth layer, the widths of the menu list M1 of the first layer and the menu list M2 of the second layer can be displayed within a range of the width W2 which is larger than the width W3. Since, the eighth mode improves the difficulty to check the menus of higher layers by the width size reduction of the corresponding menu lists, the menus of higher layers can be easily checked.

When the user desires the menu lists M0 and M1 to be displayed again, the user only needs to press the selection key 40d in a state where the cursor K is still positioned at "8", or to set another mode once and to select the eighth mode again.

Subsequently, the hierarchical structure will be displayed in accordance with an instruction of the user in a similar manner as described with reference to FIGS. 4(a)-4(d). For example, the user advances through layers in the eighth mode, the number of n-th layers to be displayed does not change as long as the user does not press the selection key 40d. More specifically, the selection key 40d is pressed once at the "B" section, that is, two layers are displayed as shown in FIG. 12(b). As far as the selection key 40d is not pressed at the "8" section, two layers ((n−1)-th layer and n-th layer) are displayed on the screen of the LCD 41 even if the user advances operations to the lower layers by selecting or setting the menus.

In the eighth mode, the CPU 11 controls the LCD 41 to display in the screen a part of the menu list that have been accessed in selecting the items and to hide a remaining part of the menu lists that have been accessed in setting the menus.

Next, the ninth mode is described with reference to FIGS. 13(a)-13(c). The ninth mode has a display style similar to the display style of the eighth mode. In the display style of the ninth mode, a menu list to be hidden from the screen can be switched by scrolling the screen.

Figure 13A:
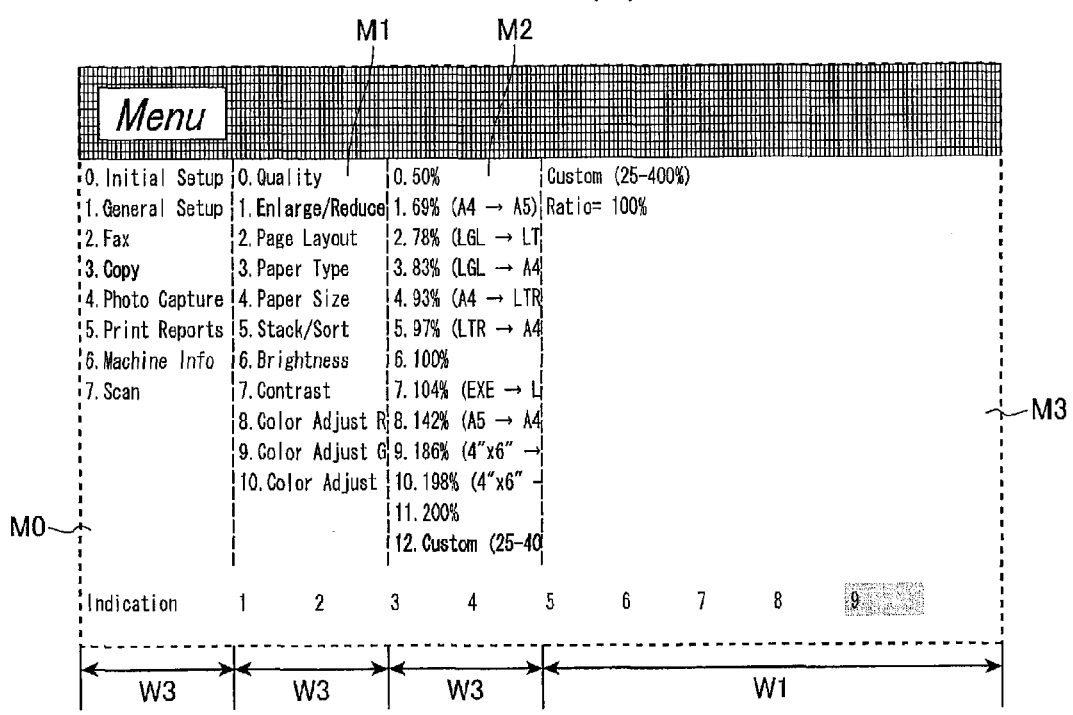
FIG. 13(a) is a diagram illustrating a transition of the menu screen from the first mode to a ninth mode.

When the user intend to selects the ninth mode from the state shown in FIG. 4(d), as shown in FIG. 13(a) the user operates the direction keys 40c to move the cursor K to a section of "9" and presses the selection key 40d. Then, the CPU 21 sets the ninth mode. As shown in FIG. 13(b) the menu list M0 of the zeroth layer is hidden from the screen of the LCD 41. Then, the width of the menu list M1 of the first layer and the width of the menu list M2 of the second layer are enlarged from W3 to W2.

In addition, when the user presses the selection key 40d again in a state where the cursor K is positioned at "9", as shown in FIG. 13(c) the menu list M2 of the second layer are hidden from the screen of the LCD 41. Then, the menu list M0 of the zeroth layer is displayed with the width W2 again.

When the user wants the menu list M2 to be displayed again, the user only needs to press the selection key 40d in a state where the cursor K is still positioned at "9", or set another mode once and select the ninth mode again.

In the ninth mode, the CPU 11 controls the LCD 41 to display in the screen a part of the menu list that have been accessed in selecting the items and to hide a remaining part of the menu lists that have been accessed in setting the menus. Further, the CPU 11 controls the LCD 41 to display (redisplay) in the screen a remaining part of the menus that have been accessed in selecting the items.

There are other methods to select the ninth mode. For example, when the user selects the ninth mode from the eighth mode as shown in FIG. 12(b), as shown in FIG. 13(b) the user operates the direction keys 40c to move the cursor K to a section of "9" and presses the selection key 40d. Then, the ninth mode is set, and as shown in FIG. 13(c) the menu list M2 of the second layer is hidden from the screen of the LCD 41. Then, the menu list M0 of the zeroth layer is displayed with the width W2 again.

While the invention has been described in detail with reference to the above embodiment thereof, it would be apparent to those skilled in the art that various changes and modifications may be made therein without departing from the spirit of the invention.

In the above embodiment, the first mode is set to be the normally set mode. However, a pair of the first mode and one of the second to the ninth modes may be set as the normally set mode. That is, the normally set mode in this case have both of the feature of the first mode which displays each menu list from left to right in order of layer from highest layer with left alignment, and the feature of one of the second to the ninth modes described above. In such a case, the mode selection does not need to be carried out, and a history of the selected menus which have been selected by the user can be checked at a glance.

In addition, in the above embodiment, the icons are displayed in the corresponding menus lists in the fifth mode. However, the positions of the displayed icons may be changed. For example, the icons may be displayed in a line parallel to the width direction of a display device on a top part of the screen. Further, only the icons may be displayed in stead of displaying the selected menus.

Further, in the embodiment, the multifunction device 1 is described as the hierarchical structure display device of the invention. However, the invention is not limited to the multifunction device 1 as the hierarchical structure display device. The hierarchical structure display device of the invention may be a personal computer, a portable phone, a video player, a DVD player, a MD player, and a TV, for example, as long as such devices require the hierarchical structure to be displayed. However, the invention is especially effective for a device having a small display device that displays the hierarchical structure.

What is claimed is:

1. A hierarchical structure display device comprising:
a hierarchical structure storing unit that stores information about a hierarchical structure of menus where each item contained in a menu is linked to a directly beneath level menu;
a display unit that has a display screen extending in a first direction and a second direction orthogonal to the first direction;
a designating unit that designates an item contained in each of the menus; and
a display control unit that controls the display unit to display at least one menu in the display screen based on the information stored in the hierarchical structure storing unit and to preserve at least a first region in the display screen for displaying titles of items contained in a menu of interest,
wherein the titles of items contained in a menu are arranged one after another in the second direction with each title extending in the first direction, and the first region has a first length in the first direction long enough to entirely visibly indicate the titles of items,
wherein the first length is an entire length of the first region in the first direction,
wherein, when the designating unit designates items in succession while advancing to a deeper level of the menus, the display control unit controls the display unit to preserve in the display screen the first region and a second region that has a second length in the first direction and to display at least a part of the menus in the second region,
wherein the second length is an entire length of the second region in the first direction,
wherein the second length is less than the first length, and
wherein the second region comprises a first end line and a second end line, each of which is displayed on the display unit, such that both the first end line and the second end line extend beyond the second region in the second direction, and the titles of items displayed in the second region are arranged one after another in the second direction between the first end line and the second end line,
wherein the display control unit controls the display unit to display a title of the designated item in the second region, such that the title of the designated item extends beyond the second end line, the title of the designated item is entirely displayed in the display screen while the control unit controls the display unit to display at least a portion of a title of each item other than the designated item in the second region, and the title of each item other than the designated item in the second region does not extend beyond the second end line when the designating unit designates items in succession while advancing to a deeper level of the menus, the designated item designated by the designating unit is displayed in the second region adjacent to the first region,
wherein the second length is not long enough to entirely display the title of the designated item.

2. The hierarchical structure display device as claimed in claim 1, wherein the display control unit controls the display unit to display the designated item to have a display style different from a display style of an item other than the designated item.

3. The hierarchical structure display device as claimed in claim 2, wherein the display style is selected from the group consisting of a size of letters, a thickness of letters, a color of letters, a font of letters, and a decoration of letters.

4. The hierarchical structure display device as claimed in claim 3, wherein the display control unit changes at least one of the size of letters and the thickness of letters depending on a number of items designated in succession.

5. The hierarchical structure display device as claimed in claim 1, further comprising an icon storing unit that stores icons in association with the items,
wherein the display control unit controls the display unit to display in the display screen an icon in association with an item designated by the designating unit.

6. The hierarchical structure display device as claimed in claim 1, wherein when the designating unit designates items in succession while advancing to a deeper level of the menus, the display control unit controls the display unit to display in the display screen a part of the menus that have been accessed in designating the items and to hide a remaining part of the menus that have been accessed in designating the items.

7. The hierarchical structure display device as claimed in claim 6, wherein the display control unit controls the display unit to display in the display screen a remaining part of the menus that have been accessed in designating the items.

8. The hierarchical structure display device as claimed in claim 1, wherein the display control unit controls the display unit to dynamically change the second length of the second region.

9. The hierarchical structure display device as claimed in claim 1, wherein when the designating unit designates items in succession while advancing to a deeper level of the menus, the items designated by the designating unit are displayed in sub areas of the second region on a menu-by-menu basis to be arranged along a line parallel to the first direction, the display control unit controls the display unit to display each title of items to extend beyond a sub area so that the each title of the designated items is entirely visually indicated in the display screen.

10. The hierarchical structure display device as claimed in claim 9, wherein when titles of items to be displayed in adjacent sub areas are longer than respective lengths of the sub areas in the first direction, the display control unit controls the display unit to display a title of one item so that the title of the one item is entirely visually indicated in the display screen.

11. The hierarchical structure display device as claimed in claim 9, wherein when titles of items to be displayed in adjacent sub areas are longer than respective lengths of the sub areas in the first direction, the display control unit changes a position in the second direction of at least one of the titles of items to prevent interference to the title of item displayed in adjacent sub area.

12. The hierarchical structure display device as claimed in claim 1, wherein the display control unit controls the display unit to rotate a title of item designated by the designating unit to be oriented in a direction parallel to the second direction.

13. The hierarchical structure display device as claimed in claim 1, wherein the display control unit maintains a displaying state of the display unit until further item is designated.

14. The hierarchical structure display device as claimed in claim 1, wherein the designating unit sets a parameter.

15. A hierarchical structure display method that controls a hierarchical structure display device storing information about a hierarchical structure of menus where each item contained in a menu is linked to a directly beneath level menu, and having a display unit that has a display screen extending in a first direction and a second direction orthogonal to the first direction, the method comprising:

designating an item contained in each of the menus; and controlling the display unit to display at least one menu in the display screen based on the information about the hierarchical structure of menus and to preserve at least a first region in the display screen for displaying titles of items contained in a menu of interest, wherein the titles of items contained in a menu are arranged one after another in the second direction with each title extending in the first direction, and the first region has a first length in the first direction long enough to entirely visibly indicate the titles of items, wherein the first length is an entire length of the first region in the first direction, wherein, when designating the item comprises designating items in succession while advancing to a deeper level of the menus, the controlling controls the display unit to preserve in the display screen the first region and a second region that has a second length in the first direction and to display at least a part of the menus in the second region, wherein the second length is an entire length of the second region in the first direction, wherein the second length is less than the first length, and wherein the second region comprises a first end line and a second end line, each of which are displayed on the display unit, such that both the first end line and the second end line extend beyond the second region in the second direction, and the titles of items displayed in the second region are arranged one after another in the second direction between the first end line and the second end line, wherein controlling the display unit comprises controlling the display unit to display a title of the designated item in the second region, such that the title of the designated item extends beyond the second end line, the title of the designated item is entirely displayed in the display screen while the control unit controls the display unit to display at least a portion of a title of each item other than the designated item in the second region, and the title of each item other than the designated item in the second region does not extend beyond the second end line when designating the item comprises designating items in succession while advancing to a deeper level of the menus, the designated item is displayed in the second region adjacent to the first region, wherein the second length is not long enough to entirely display the title of the designated item.

16. A non-transitory computer-readable storage medium storing a set of program instructions executable on a hierarchical structure display device that stores information about a hierarchical structure of menus where each item contained in a menu is linked to a directly beneath level menu, and that has a display unit having a display screen extending in a first direction and a second direction orthogonal to the first direction, the program instructions comprising:

designating an item contained in each of the menus; and controlling the display unit to display at least one menu in the display screen based on the information about the hierarchical structure of menus and to preserve at least a first region in the display screen for displaying titles of items contained in a menu of interest, wherein the titles of items contained in a menu are arranged one after another in the second direction with each title extending in the first direction, and the first region has a first length in the first direction long enough to entirely visibly indicate the titles of items, wherein the first length is an entire length of the first region in the first direction, wherein, when designating the item comprises designating items in succession while advancing to a deeper level of the menus, the controlling controls the display unit to preserve in the display screen the first region and a second region that has a second length in the first direction and to display at least a part of the menus in the second region, wherein the second length is an entire length of the second region in the first direction, wherein the second length is less than the first length, and wherein the second region comprises a first end line and a second end line, each of which are displayed on the display unit, such that both the first end line and the second end line extend beyond the second region in the second direction, and the titles of items displayed in the second region are arranged one after another in the second direction between the first end line and the second end line, wherein controlling the display unit comprises controlling the display unit to display a title of the designated item in the second region, such that the title of the designated item extends beyond the second end line, the title of the designated item is entirely displayed in the display screen while the control unit controls the display unit to display at least a portion of a title of each item other than the designated item in the second region, and the title of each item other than the designated item in the second region does not extend beyond the second end line when designating the item comprises designating items in succession while advancing to a deeper level of the menus, the designated item is displayed in the second region adjacent to the first region, wherein the second length is not long enough to entirely display the title of the designated item.

* * * * *